United States Patent
Timmons et al.

(10) Patent No.: US 11,991,137 B2
(45) Date of Patent: May 21, 2024

(54) NOTIFICATION TIMING IN A GROUP-BASED COMMUNICATION SYSTEM

(71) Applicant: Salesforce, Inc., San Francisco, CA (US)

(72) Inventors: Andy Timmons, Washington, DC (US); Aaron Maurer, Emeryville, CA (US); Lichen Ni, Vancouver (CA)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/660,870

(22) Filed: Apr. 27, 2022

(65) Prior Publication Data

US 2023/0353525 A1  Nov. 2, 2023

(51) Int. Cl.
*H04L 51/224* (2022.01)
*G06F 3/14* (2006.01)
*H04L 51/043* (2022.01)

(52) U.S. Cl.
CPC .............. *H04L 51/224* (2022.05); *G06F 3/14* (2013.01); *H04L 51/043* (2013.01)

(58) Field of Classification Search
CPC ....... H04L 51/224; H04L 51/043; G06F 3/14; G06F 3/048; G06F 3/04883; G06F 3/0484; G06F 3/041; G06F 3/0482; G06F 3/0488; G06F 3/0481

See application file for complete search history.

(56) References Cited

U.S. PATENT DOCUMENTS

| | | | | |
|---|---|---|---|---|
| 9,959,551 | B1 * | 5/2018 | Schermerhorn | H04L 67/63 |
| 10,051,600 | B1 * | 8/2018 | Zhong | H04L 67/12 |
| 10,516,737 | B2 * | 12/2019 | Ferencz, Jr. | B61L 3/127 |
| 10,616,165 | B2 * | 4/2020 | Ganesh | A61B 5/4812 |
| 10,616,167 | B2 * | 4/2020 | Ganesh | H04W 68/005 |
| 10,805,400 | B2 * | 10/2020 | Ferencz, Jr. | B61L 15/0018 |

(Continued)

OTHER PUBLICATIONS

"Die, Email, Die! A Flickr Cofounder Aims to Cut Us All Some Slack", Readwriteweb, LexisNexis, https://advance.lexis.com/api/permalink/33dd79e2-9015-409d-ae27-5a2c7e86bf31/?context=1000516>. (dated Aug. 14, 2013, 4:15 PM) 2 pages.

(Continued)

*Primary Examiner* — Ninos Donabed
(74) *Attorney, Agent, or Firm* — Holland & Hart LLP

(57) ABSTRACT

Methods, systems, apparatuses, devices, and computer program products are described. A group-based communication system may determine timing for sending notifications to users of the group-based communication system to improve the likelihood of the users interacting with the notifications, interacting with other users in the system, or both. For example, the group-based communication system may identify a notification to send to a user, where the user is associated with a user identifier and a workspace identifier in the group-based communication system. The system may dynamically determine a time for sending the notification based on activity data for the user corresponding to the user identifier and activity data for multiple other users corresponding to the workspace identifier (e.g., members of a team with the user). The system may send the notification for display in a user interface of a user device operated by the user at the determined time.

16 Claims, 9 Drawing Sheets

(56) References Cited

U.S. PATENT DOCUMENTS

| | | | | |
|---|---|---|---|---|
| 11,582,319 | B1* | 2/2023 | Khoo | H04L 51/234 |
| 2009/0315678 | A1* | 12/2009 | Padmanabhan | H04Q 9/00 |
| | | | | 340/10.1 |
| 2010/0088170 | A1* | 4/2010 | Glore, Jr. | G06Q 30/0217 |
| | | | | 705/14.69 |
| 2010/0313252 | A1* | 12/2010 | Trouw | G06F 16/958 |
| | | | | 715/760 |
| 2014/0258055 | A1* | 9/2014 | Wolfe | G06Q 20/321 |
| | | | | 705/30 |
| 2017/0001653 | A1* | 1/2017 | Ferencz, Jr. | G16Y 10/40 |
| 2017/0011308 | A1* | 1/2017 | Sun | G06F 11/00 |
| 2017/0039332 | A1* | 2/2017 | Yom-Tov | G16H 50/30 |
| 2017/0237789 | A1* | 8/2017 | Harner | H04L 65/4015 |
| | | | | 709/205 |
| 2017/0309142 | A1* | 10/2017 | Phillips | G08B 13/1672 |
| 2018/0063062 | A1* | 3/2018 | Burdakov | H04L 51/226 |
| 2018/0197099 | A1* | 7/2018 | Liang | G06Q 30/0255 |
| 2018/0287982 | A1 | 10/2018 | Draeger et al. | |
| 2018/0321949 | A1* | 11/2018 | Bikumala | G06F 3/04817 |
| 2018/0321950 | A1* | 11/2018 | Bikumala | G06F 3/04817 |
| 2019/0007546 | A1* | 1/2019 | Anderson | H04M 1/72454 |
| 2019/0044902 | A1* | 2/2019 | Teplow | G06Q 10/06 |
| 2019/0124032 | A1* | 4/2019 | Ganesh | G06F 1/163 |
| 2019/0259262 | A1* | 8/2019 | Amini | G06V 20/52 |
| 2020/0067724 | A1* | 2/2020 | Hewitt | G06Q 10/10 |
| 2020/0128080 | A1* | 4/2020 | Ferencz, Jr. | B61L 3/127 |
| 2020/0302940 | A1* | 9/2020 | Herbach | G10L 15/183 |
| 2021/0019727 | A1* | 1/2021 | Edwards | G06Q 20/4015 |
| 2021/0319673 | A1* | 10/2021 | Amini | G08B 13/1966 |
| 2021/0322828 | A1* | 10/2021 | Gherscovici | A61B 5/6824 |
| 2021/0335356 | A1* | 10/2021 | Burakov | G10L 15/22 |
| 2021/0397602 | A1* | 12/2021 | Benkreira | G06F 16/909 |
| 2021/0406836 | A1* | 12/2021 | Bar-on | G06F 40/205 |
| 2022/0013195 | A1* | 1/2022 | Sanae | G06F 21/31 |
| 2022/0114560 | A1* | 4/2022 | Senzer | G07C 5/085 |
| 2022/0230094 | A1* | 7/2022 | Panitsas | G06F 11/3447 |
| 2022/0309356 | A1* | 9/2022 | Singh | G06N 5/02 |
| 2022/0318120 | A1* | 10/2022 | Hao | G06F 21/31 |
| 2022/0368665 | A1* | 11/2022 | Walters | G06F 40/30 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online] [retrieved May 9, 2019]. Retrieved from the Internet: <URL: https://slate.com/business/2014/05/stewart-butterfield-flickr-and-slack-how-he-snatched-victory-from-the-jaws-of-defeat.html> (dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", GIGAOM, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", Fujitsu Sci. Tech. J., 36, 2, (Dec. 2000) 154-161.

Matthew Ingram, "Flickr co-founder launches Slack, an all-in-one messaging tool designed to kill email forever", GIGAOM, LexisNexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a819-4d7d-9573-89d9598a4963/?context=1000516> (dated Oct. 31, 2014) 2 pages.

Olkarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

NOTIFICATION TIMING IN A GROUP-BASED COMMUNICATION SYSTEM

TECHNICAL FIELD

The present disclosure relates generally to communication systems and data processing, and more specifically to notification timing in a group-based communication system.

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

Users may communicate information using a communication platform (e.g., a group-based communication system, separate from or associated with the cloud platform). In some examples, the communication platform may support different groups of users sharing content within specific channels. In some cases, the communication platform may trigger notifications to users of the platform, for example, to send a reminder to a specific user or group of users. However, if the notification is sent at a time when the user is not active on the communication platform—or when other users in a group with the user are not active on the communication platform—the user may ignore, or otherwise fail to engage with, the notification, which may result in inefficient communications within the communication platform.

SUMMARY

The described techniques relate to improved methods, systems, devices, and apparatuses that support determining notification timing in a group-based communication system. The group-based communication system may dynamically determine transmission timings for notifications to improve the likelihood that a user interacts with a notification, interacts with other users in the group-based communication system, or both. In some examples, the group-based communication system may identify a notification to send to a user of the group-based communication system. The notification may be an example of an email notification, an in-application notification (e.g., within an application supporting the group-based communication system), a text message, or any other notification format. The user may be associated with a user identifier within the group-based communication system, and the user may be a member of a workspace corresponding to a workspace identifier in the group-based communication system. The group-based communication system may determine a time for sending the notification to the user based on both activity data for the user corresponding to the user identifier and activity data for multiple other users who are members of the workspace corresponding to the workspace identifier. As such, the group-based communication system may adjust the timing for sending a notification specific to a user such that the user may engage with the notification and may interact with the other users who are members of the same workspace in response to the notification. The system may send the notification to a user device operated by the user at the time determined by the group-based communication system.

The techniques described herein may improve the usability, functionality, and user experience of a group-based communication system. For example, the techniques may support improving user adoption of the group-based communication system and improve user engagement with notifications, other users in the system, or both. In some cases, a notification may include a reminder for a user to join a specific channel within the group-based communication system. By determining a time to send the reminder based on when other users are active in the channel, the group-based communication system may increase the likelihood that the user receiving the reminder will join the channel and be able to interact with other users in the channel, improving user engagement within the system. Additionally or alternatively, by dynamically updating a machine learning model or other technique for determining timing for sending notifications, the system may adapt to changes in user behavior, organization behavior, or the like, such that notifications may be sent at times optimized based on up-to-date user activities. In some examples, dynamically determining times for sending notifications may improve open rates for the notifications, click rates for the notifications, or both, improving the likelihood that a user views and interacts with a notification. Such improvements may result in more reliable responses from users, greater interaction between users, more consistent communications within group-based communication channels, or any combination of these or other improvements in user engagement for the group-based communication system.

DETAILED DESCRIPTION

Figure 1:
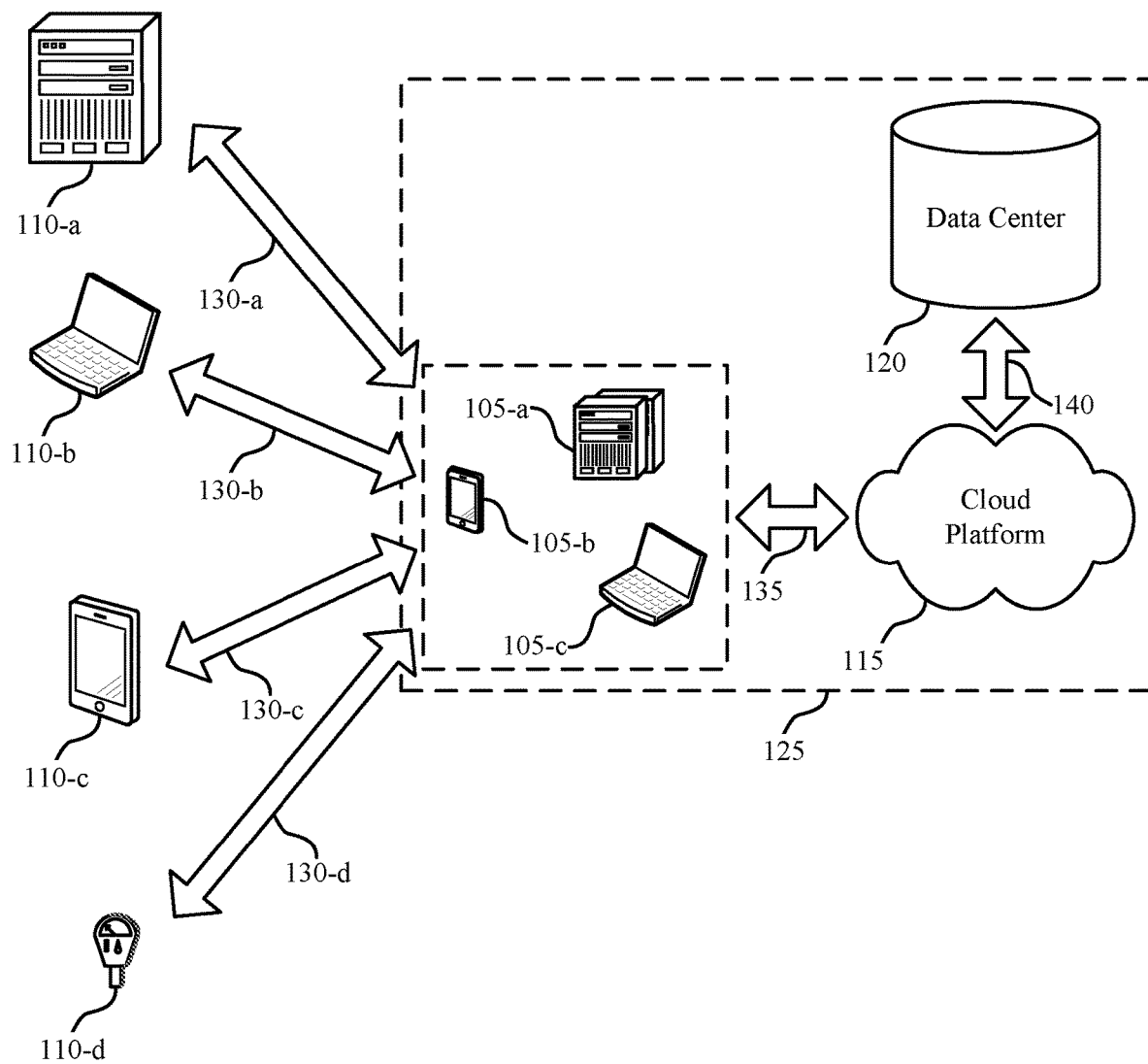
FIG. 1 illustrates an example of a system that supports determining notification timing in a group-based communication system in accordance with aspects of the present disclosure.

A group-based communication system may support multiple group-based communication channels. A group-based communication channel may provide a virtual space in which users of a group may communicate, for example, by posting messages, entering hangout meetings, performing calls, sharing files, or communicating using any other means. In some systems, an organization (e.g., a tenant of a multi-tenant database system or another organization) may use multiple different channels within the group-based communication system. In some examples, the organization may correspond to a workspace within the group-based communication system, where the workspace corresponds to a specific workspace identifier. The group-based communication system may support triggering notifications to users of the system, for example, to send reminders to the users. For example, a notification may remind a user to join a group-based communication channel, join a meeting or call, respond to a communication in a channel, view a communication in a channel, sign up for the group-based communication system, or any combination of these or other relevant reminders. The time at which a notification (e.g., a reminder) is sent may affect the likelihood that a recipient of the notification engages with the notification (e.g., opens the notification, clicks a link within the notification). However, with different users operating in different time zones, according to different schedules, and with different preferences, using a single scheme to determine when to send notifications may fail to optimize user engagement across multiple users of the group-based communication system.

Techniques described herein may support dynamically determining notification timing in a group-based communication system. The group-based communication system may determine transmission timings for notifications to improve the likelihood that a user interacts with a notification, interacts with other users in the group-based communication system, or both. In some examples, the group-based communication system may identify a notification to send to a user of the group-based communication system. The user may be associated with a user identifier, and the user may be a member of a workspace corresponding to a workspace identifier in the group-based communication system. The group-based communication system may determine a time for sending the notification to the user based on both activity data for the user (e.g., corresponding to the user identifier) and activity data for multiple other users who are members of the same workspace (e.g., corresponding to the workspace identifier). As such, the group-based communication system may adjust the timing for sending a notification specific to a user to optimize—or otherwise improve the likelihood of—the user interacting with the notification and with the other users who are members of the same workspace. The system may send the notification to a user device operated by the user at the time determined by the group-based communication system.

As an example, if a notification includes a reminder for a user to join a group-based communication channel, the system may determine to send the notification at a time when the user is likely to be active in the system and when other users are likely to be active in the specific group-based communication channel. Accordingly, the user may be relatively likely to click through the reminder and join the channel as a new user, because the user may be active when the notification is received. Moreover, the new user may be relatively likely to immediately engage with other users in the group-based communication channel, because these other users may be active in the channel when the new user initially joins the channel. Initial user engagement within the channel may support the new user gaining value from the channel and becoming comfortable communicating using the channel, increasing user adoption of group-based communication channels within a group-based communication system.

Aspects of the disclosure are initially described in the context of an environment supporting an on-demand database service and an environment supporting a group-based communication system. Additional aspects of the disclosure are described with reference to processes performed within a group-based communication system to support notifications. Aspects of the disclosure are further illustrated by and described with reference to apparatus diagrams, system diagrams, and flowcharts that relate to determining notification timing in a group-based communication system.

FIG. 1 illustrates an example of a system 100 that supports notification timing in a group-based communication system in accordance with aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In some other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, the system 100 may further support a group-based communication system. For example, a group-based communication system may provide a platform for users to communicate within groups defined by group-based communication channels. The group-based communication system may leverage one or more aspects of the subsystem 125. For example, data objects stored in the data center 120, the cloud platform 115, or both may be accessed or otherwise referenced within a channel of the group-based communication system. Additionally or alternatively, the cloud platform 115 may support a group-based communication platform.

The system 100 may support determining timing for sending notifications to users (e.g., cloud clients 105, contacts 110) of the system 100 to improve the likelihood of the users engaging with the notifications, interacting with other users of the system, or both. For example, the system 100 may identify a notification to send to a user, where the user is associated with a user identifier and a workspace identifier in the system 100 (e.g., a system 100 supporting a group-based communication system). The system 100 may dynamically determine a time for sending the notification based on activity data for the user and activity data for other users corresponding to the same workspace identifier. In some examples, the system 100 may store activity data for the users of the group-based communication system, for example, in a data center 120, a cloud platform 115, or both. The system 100 may leverage such data to train one or more machine learning models for optimizing notification sending times. In some examples, the system 100 may train one model. In some other examples, the system 100 may train multiple models, such as workspace-specific models (e.g., organization or tenant-specific models), channel-specific models, user-specific models, or the like. A trained machine learning model may receive, as input, information relating to a notification to send, and the trained machine learning model may output a time (e.g., a recommended time) for sending the notification. The system 100 may send the notification to the user (e.g., a user device operated by the user) at the determined time. As such, the system 100 may send different notifications at different times (e.g., to different users, to the same user for different channels) to improve the likelihood of user engagement with the notifications.

Some other systems may automatically send notifications at a set time. This time may be the same across an organization (e.g., 9 a.m. Eastern Time) or may be different for different users (e.g., based on different work shifts, different time zones). In some cases, a user may specify a user-specific default time for receiving notifications. However, such systems may fail to account for when specific users are actually likely to engage with such notifications, and these systems may fail to adapt to actual user behavior. For example, when a user starts working, the user may have a lot of information to process and multiple messages to respond to, and as such the user may dismiss or otherwise overlook notifications. In some other cases, systems may determine a time to send a notification to a user based on when the user is active in an application associated with the notification. For example, an email notification may be sent when a user logs into the user's email account in an email application. However, such systems may fail to account for other users in the systems. For example, in a group-based communication system supporting group-based communication channels, having one user active in a channel may not benefit (or may negligibly benefit) communications and interactions in the channel. Therefore, sending a notification relating to this channel to a user simply based on that user's activity may fail to optimize channel usage, communications, and user engagement within the group-based communication system.

In contrast, the system 100 may determine notification timing based on multiple features, including activity data for multiple users within a group-based communication system. For example, an optimal time for sending a notification to a user may not just be based on that user's activity data but may be further based on activity data for other users in the same organization or workspace as the user, activity data for other users in a same group-based communication channel as the user, or some combination thereof. The system 100 may use a combination of such activity data—in some cases, along with other data and parameters associated with one or more users, a workspace, location information, user-specified settings, or any combination thereof—to determine when to send a notification. For example, the system 100 may train a machine learning model using such data, and the trained machine learning model may output timing information for sending notifications based on specific aspects of the notifications. The system 100 may retrain or otherwise update the machine learning model as additional data is collected, improving notification timing based on up-to-date user engagement data. As such, the system 100 may support dynamically determining notification timing using activity data for multiple users to improve user engagement within a group-based communication system.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
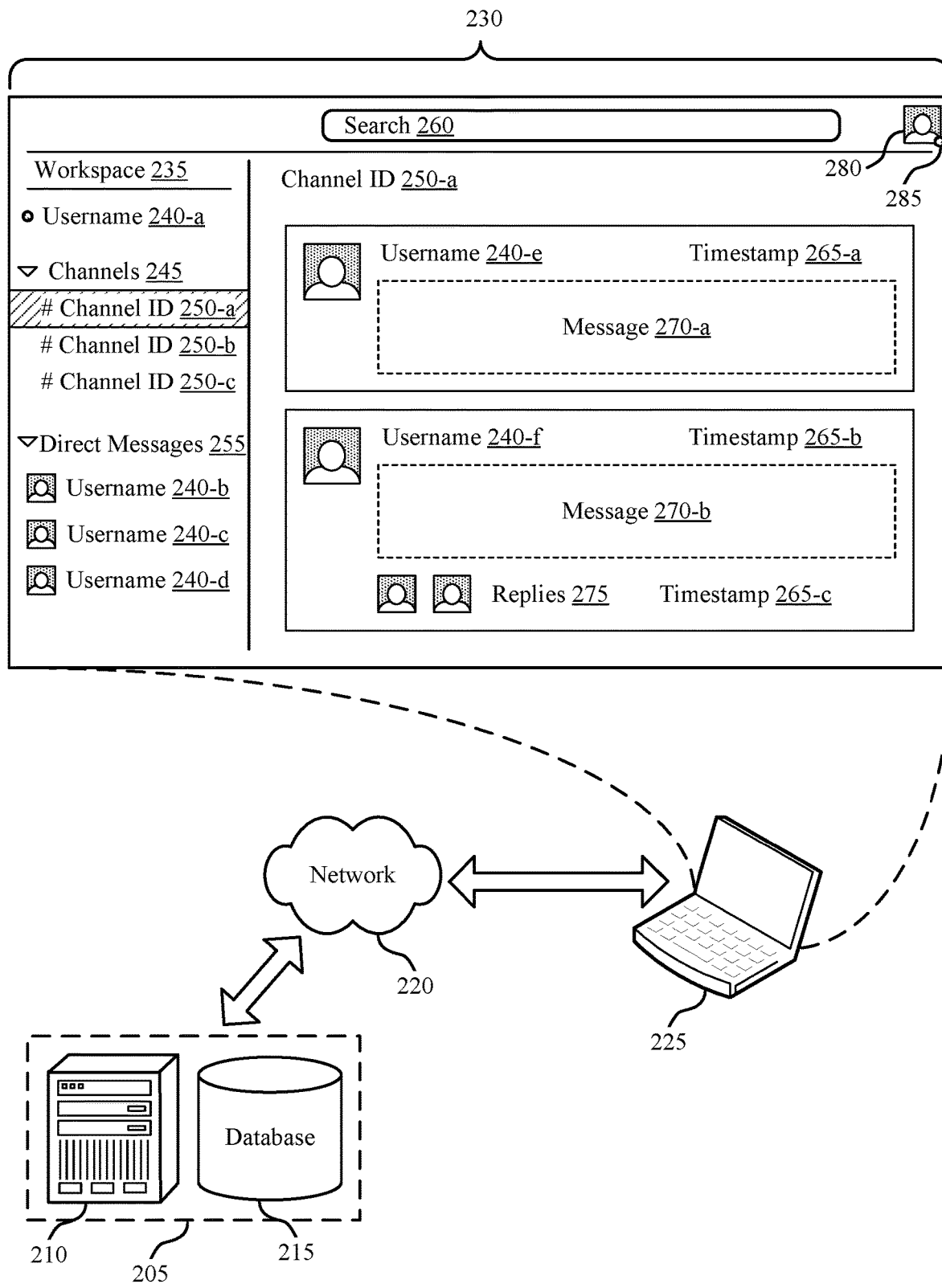
FIGS. 2 and 3 illustrate examples of group-based communication systems that support determining notification timing in accordance with aspects of the present disclosure.

FIG. 2 illustrates an example of a group-based communication system 200 that supports determining notification timing in accordance with aspects of the present disclosure. The group-based communication system 200 may be implemented as part of or with a system 100. For example, the group-based communication system 200 may leverage data stored at a cloud platform 115, a data center 120, or some combination thereof. The group-based communication system 200 may include a group-based communication platform 205 hosted by one or more computing devices 210, databases 215, or a combination thereof. The group-based communication system 200 may support displaying data to a user via a user interface 230 of a user device 225. In some examples, the user device 225 may communicate with the group-based communication platform 205 via a network 220. In some cases, the user device 225 may be an example of a cloud client 105 or a contact 110 in a system 100, as described with reference to FIG. 1.

The group-based communication platform 205 may leverage a network-based computing system to enable users of the group-based communication platform 205 to exchange data. By being "group-based," the platform may support communication channels, messages, virtual spaces, or a combination thereof organized into groups of users. The group-based communication platform 205 may include security policies or features that define access to resources (e.g., channels, messages) according to such groups. In some examples, the groups of users may be defined by group identifiers, which may be associated with common access credentials, domains, or the like. In some examples, the group-based communication platform 205 may provide a virtual space enabling users to chat, meet, call, collaborate, transfer files or other data, or otherwise communicate within groups. In some examples, a group may be associated with a workspace 235, enabling users associated with the group to communicate within the group in a secure and private virtual space. In some cases, members of a group or a workspace may be associated with a same organization (e.g., a tenant of a multi-tenant database system). In some other cases, members of a group or a workspace may be associated with different organizations (e.g., entities with different organization identifiers, such as different tenants in a multi-tenant database system).

One or more computing devices 210 may support the group-based communication platform 205. For example, the one or more computing devices 210 may include an application server, a database server, a cloud-based server or service, a worker server, a server cluster, a virtual machine, a container, or any combination of these or other computing devices supporting data processing. For example, the one or more computing devices 210 may include one or more processors, memory, computer-readable media, or a combination thereof. The one or more computing devices 210 may perform functions and provide features as described herein with respect to the group-based communication platform 205. The group-based communication platform 205 may further include one or more databases 215, which may include cloud-based data storage, physical data storage, or both. In some cases, the one or more databases 215 may be memory components of the one or more computing devices 210. The one or more databases 215 may store data associated with the group-based communication platform 205. For example, the one or more databases 215 may include data relating to channels, users, workspaces 235, or any combination thereof, logs of messages 270, security information, or any other information relevant to the group-based communication platform 205.

A user may access the group-based communication platform 205 using a user device 225. The user device 225 may be an example of a laptop, a desktop computer, a smartphone, a tablet, a smart device, or any other device operated by a user and including a user interface 230. The user device 225 may communicate with the group-based communication platform 205, for example, via a network 220. The network 220 may be any type of communication network, such as a local area network or a wide area network, the Internet, a wireless network, a cellular network, a local wireless network, Wi-Fi, Bluetooth®, Bluetooth Low Energy (BLE), Near Field Communication (NFC), a wired network, or any combination of these or other networks. The network 220 may support proper network protocols for transferring data between the user device 225 and the group-based communication platform 205. For example, the user device 225, the group-based communication platform 205, or both may apply one or more security protocols (e.g., encryption) for securely transferring data over the network 220. In some cases, one or more aspects of the group-based communication platform 205 may be implemented at the user device 225. For example, the user device 225 may download an application corresponding to the group-based communication platform 205 and may store information relating to the group-based communication platform 205 locally at the user device 225. In some other examples, the user device 225 may access the group-based communication platform 205 in a web browser.

The user device 225 may include a user interface 230 that may display information relating to the group-based communication platform 205. Additionally, a user may interact with the user interface 230 to communicate with other users, view data, modify data, or otherwise perform actions associated with the group-based communication platform 205. The group-based communication platform 205 may support multiple group-based communication channels, and the user interface 230 may display information relating to a group-based communication channel corresponding to a channel identifier 250-a. The user interface 230 may display a sidebar including navigation information for a user and a central pane (e.g., a main pane) including the channel contents, such as a sequential listing of messages 270 corresponding to the channel identifier 250-a. A channel (e.g., a group-based communication channel) may provide a virtual space for a group of users to communicate via messages, hangouts, video or audio calls, files, or any other means of communication. The group of users may include members of the channel, non-members of the channel with access to the channel, or both.

A user may log into the group-based communication platform 205 (e.g., using a username 240-a, a password, or both). In response to the user logging in, the group-based communication platform 205 may send, for display in the user interface 230, data corresponding to the user. For example, the user may be associated with a specific workspace 235, a set of channels 245, a set of connections, a set of threads, a set of direct messages 255, or any combination of these. The user device 225 may retrieve or otherwise access the relevant information for the user (e.g., based on the username 240-a or another user identifier) and surface the information for display in the user interface 230 according to a display format.

As an example, in a sidebar (e.g., a navigation pane), the user interface 230 may display an indication of a workspace 235 corresponding to the user and the username 240-a of the user. The sidebar may further include indications of a set of channels 245 using the respective channel identifiers 250. For example, the set of channels 245 may include the channels to which the user is a member. As illustrated, the set of channels 245 may include a first channel corresponding to a first channel identifier 250-a, a second channel corresponding to a second channel identifier 250-b, and a third channel corresponding to a third channel identifier 250-c. It is to be understood that the set of channels 245 may include any quantity of channels for selection by the user. The user may select a channel from the listing of the set of channels 245, and the user interface 230 may display the selected channel (e.g., the messages 270 associated with the selected channel) in the central pane. The sidebar may further include a set of direct messages 255 between the user with the username 240-a and one or more other users. For example, the set of direct messages 255 may include the usernames 240 (or nicknames) of the users communicating via direct messages with the user. In some examples, the list of users may include users added by the user with username 240-a, users who have current, ongoing direct message conversations with the user with username 240-a, or both. As illustrated, the set of direct messages 255 may include indications of a user with a first username 240-b, a user with a second username 240-c, and a user with a third username 240-d, although any quantity of users may be included in the set of direct messages 255. Selecting a username 240 from the set of direct messages 255 may cause the user interface 230 to display a set of direct messages between the logged in user and the selected user in the central pane (e.g., direct messages that are stored in the system and displayed in a sequential order).

The central pane of the user interface 230 may display the contents of a selected channel. For example, if the user selects a channel with a channel identifier 250-a, the central pane may display the selected channel identifier 250-a, as well as data corresponding to this selected channel identifier 250-a. The data for the channel may include a sequential listing of messages 270 posted to the channel. For example, a user with a username 240-e may post a first message 270-a at a first time corresponding to a timestamp 265-a. The user interface 230 may display, for the channel, this information, as well as affordances supporting actions associated with this information. For example, a user may react to the message 270-a, reply to the message 270-a, or both. As illustrated, another user with a username 240-f may post a second message 270-b at a time corresponding to a timestamp 265-b, and one or more users may reply to the message 270-b. The user interface 230 may indicate a set of replies 275 and one or more timestamps 265-c associated with the replies 275 (e.g., a timestamp 265-c corresponding to a most recent reply) with the message 270-b. Selecting the set of replies 275 may cause the user interface 230 to display the replies in a second sidebar (e.g., as a thread of messages).

The messages 270 may include text or other objects, such as files, photos, audio files, video files, documents, uniform resource locator (URL) links, or any other objects. If the selected channel is private, members of the channel may view the information related to the channel, while nonmembers of the channel may be blocked from viewing the information. If the selected channel is public, members and nonmembers of the channel may view the relevant information. In some cases, channels, users, workspaces 235, accounts, or some combination thereof may include accessibility settings or rules which may define viewing capabilities, editing capabilities, or both.

The user interface 230 may further support search functionality using a search bar 260. Additionally or alternatively, the user interface 230 may indicate a profile picture 280 of the currently logged in user, as well as a connection status 285 (e.g., online, offline, busy) of the user.

In some cases, the group-based communication platform 205 may store activity data for users accessing the group-based communication platform 205. In some examples, the activity data may be stored in one or more concurrency tables within one or more databases 215. The activity data may indicate an amount of time that a user is active in the group-based communication platform 205, when the user is active in the group-based communication platform 205, or both. For example, the activity data may track when a specific user corresponding to a user identifier is active in the group-based communication application supported by the group-based communication platform 205. A user being "active" may refer to the user being logged into the application or may refer to the user being actively interacting with the application. In one example, a user's active time may refer to when the user has the group-based communication application viewable (e.g., not minimized or otherwise hidden) in a user interface 230. In another example, a user's active time may refer to when the user has selected (e.g., via a user interface 230, such as using a mouse input) the group-based communication application. In yet another example, a user's active time may refer to when the user is interacting with the group-based communication application (e.g., scrolling in the application, typing in the application, clicking a link or other affordance in the application). In some cases, the group-based communication platform 205 may track active time for a user based on a user's most recent input into the group-based communication application in the user interface 230. For example, a user may be active if the user is logged into the group-based communication platform 205 and has interacted with the group-based communication application (e.g., scrolled, clicked, typed) within a threshold time (e.g., one minute). If the user is inactive within the application longer than the threshold time, the group-based communication platform 205 may determine that the user is no longer active and may stop tracking the user as "active" until a next input by the user to the group-based communication application.

The activity data tracked by the group-based communication platform 205 (e.g., in a database 215) may be used by the group-based communication platform 205 to determine notification timing. For example, the tracked activity data may be stored with associated user identifiers, channel identifiers 250, workspace identifiers, or a combination thereof. Accordingly, based on this stored activity data, the group-based communication platform 205 may determine when a user is most likely to be active in the group-based communication platform 205. Additionally, the group-based communication platform 205 may determine when other users who may interact with the user (e.g., other users associated with a same workspace 235 as the user, other users associated with one or more same channels as the user) are most likely to be active in the group-based communication platform 205.

In some cases, the activity data may be stored according to a set of time windows. For example, a concurrency table—or other table or data storage format—may store, for a user, the amount of time per hour that the user is active in the group-based communication application. The activity data may be stored over a period of time (e.g., multiple days, weeks). In some cases, the activity data may be averaged for these time windows. As such, the group-based communication platform 205 may determine, for a user, the average amount of time that the user is active within each hour segment of a day. For example, the group-based communication platform 205 may determine that a first user is typically most active between 10 a.m. and 11 a.m., while a second user is typically most active between 3 p.m. and 4 p.m. However, the two users may typically be most active at the same time between 2 p.m. and 3 p.m. Accordingly, to improve the likelihood of these users interacting within the group-based communication platform 205 in response to a notification, the notification may be sent between 2 p.m. and 3 p.m., rather than between 10 a.m. and 11 a.m. or between 3 p.m. and 4 p.m. Analyzing activity data across a set of users, rather than for a single user receiving a notification, may improve engagement, communications, and interactions between users within the group-based communication system 200 in response to the notification.

If the group-based communication platform 205 detects a notification to be sent to a user, the group-based communication platform 205 may use the activity data to determine a time to send the notification when the user is likely to be active and one or more other users associated with the user (e.g., users of the same workspace 235, members of a same channel) are likely to be active. The group-based communication platform 205 may send the notification to the user at the determined time. Sending the notification may involve displaying the notification in the user interface 230. In some cases, the notification may be a notification within the group-based communication application. In some other cases, the notification may be within a different application (e.g., an email application) or may be a desktop or mobile notification.

The user device 225 may receive the notification from the group-based communication platform 205 (e.g., via the network 220) and may display the notification in the user interface 230. The user operating the user device 225 may view the notification in the user interface 230. In some cases, the user may click to view the full notification (e.g., read an email notification, expand a popup notification). Such an action may be referred to as "opening" the notification. The notification may additionally include one or more links (e.g., URL links) or other selectable items that may trigger specific actions. For example, if the notification is a reminder to respond to a message 270 in a channel of the group-based communication platform 205, the notification may include a button or link that, when selected, causes the message 270 to be displayed in the user interface 230. Such a selection may be referred to as "clicking" the notification.

The group-based communication platform 205 may further track data relating to opening notifications, clicking notifications, or both. Such data may allow the group-based communication platform 205 to analyze the effectiveness of notifications. For example, the group-based communication platform 205 may track open rates for notifications (e.g., the percentage of sent notifications which are opened by a user), click rates for notifications (e.g., the percentage of sent notifications which are clicked by a user), or both. In some cases, the tracked rates may be associated with specific time windows (e.g., an open rate within the first hour after sending, a click-through rate within the first hour after sending). Open rates, click rates, or both may vary based on notification types, notification functionalities, or both. For example, email notifications (e.g., email messages), in-application notifications (e.g., notifications that are displayed within the group-based communication application), and desktop or mobile notifications (e.g., which popup in the user interface 230 of a user device 225 external to an application window) may have different open rates, click rates, or both.

Additionally, "active" notifications may have different open rates, click rates, or both as compared to "passive" notifications. An "active" notification may be triggered by a specific user action, such as a user creating a team within the group-based communication platform 205. The members of the created team may receive notifications (e.g., active notifications) as a result of the user creating the team. A "passive" notification may include a reminder or a digest and may not be triggered by a specific user action. For example, the group-based communication platform 205 may support reminders to remind users to sign up for the group-based communication application (e.g., create an account), to join a channel within the group-based communication platform 205, to view a message 270 in a channel, to respond to a message 270 in a channel, to view a direct message from another user in the group-based communication platform 205, to respond to a direct message, to join a meeting scheduled via or hosted by the group-based communication platform 205, to update a setting in the group-based communication platform 205, to provide information to the group-based communication platform 205, or any combination thereof. Additionally or alternatively, the group-based communication platform 205 may support digests that include information relating to the group-based communication platform 205 (e.g., a daily recap of activities in the group-based communication platform 205 relevant to a user or organization, one or more highlights relating to activities, features, messages, invited users, new signed-up users, or any combination thereof within the group-based communication platform 205). Such passive notifications (e.g., reminders, digests) may be sent according to some regular periodicity (e.g., daily, weekly, monthly). The group-based communication platform 205 may determine a "best" time to send a notification, such as a passive notification, based on the periodicity (e.g., a specific time within a day for a daily notification, a specific time of day and day of the week for a weekly notification).

Determining a time to send a notification may involve optimizing for a user to open the notification, optimizing for a user to click the notification, or both. For example, a "best" time to send a notification may refer to the sending time for which a user is most likely to open the notification, click the notification (e.g., complete a task with a reminder in the notification), or some combination thereof. In some examples, the group-based communication platform 205 may determine notification send times for passive notifications and may send active notifications based on trigger times (e.g., in response to a user performing an action that triggers the active notification) In some other examples, the group-based communication platform 205 may determine notification send times for both passive notifications and active notifications (e.g., using the same or different techniques or models to determine the notification timings). Additionally or alternatively, other metrics may be used for optimizations to determine a "best" time for sending a notification. For example, the group-based communication platform 205 may optimize the likelihood of a user posting a message 270 to a channel, responding to a message 270 in a channel, direct messaging another user, or any other form of user engagement within the group-based communication system 200.

Figure 3:
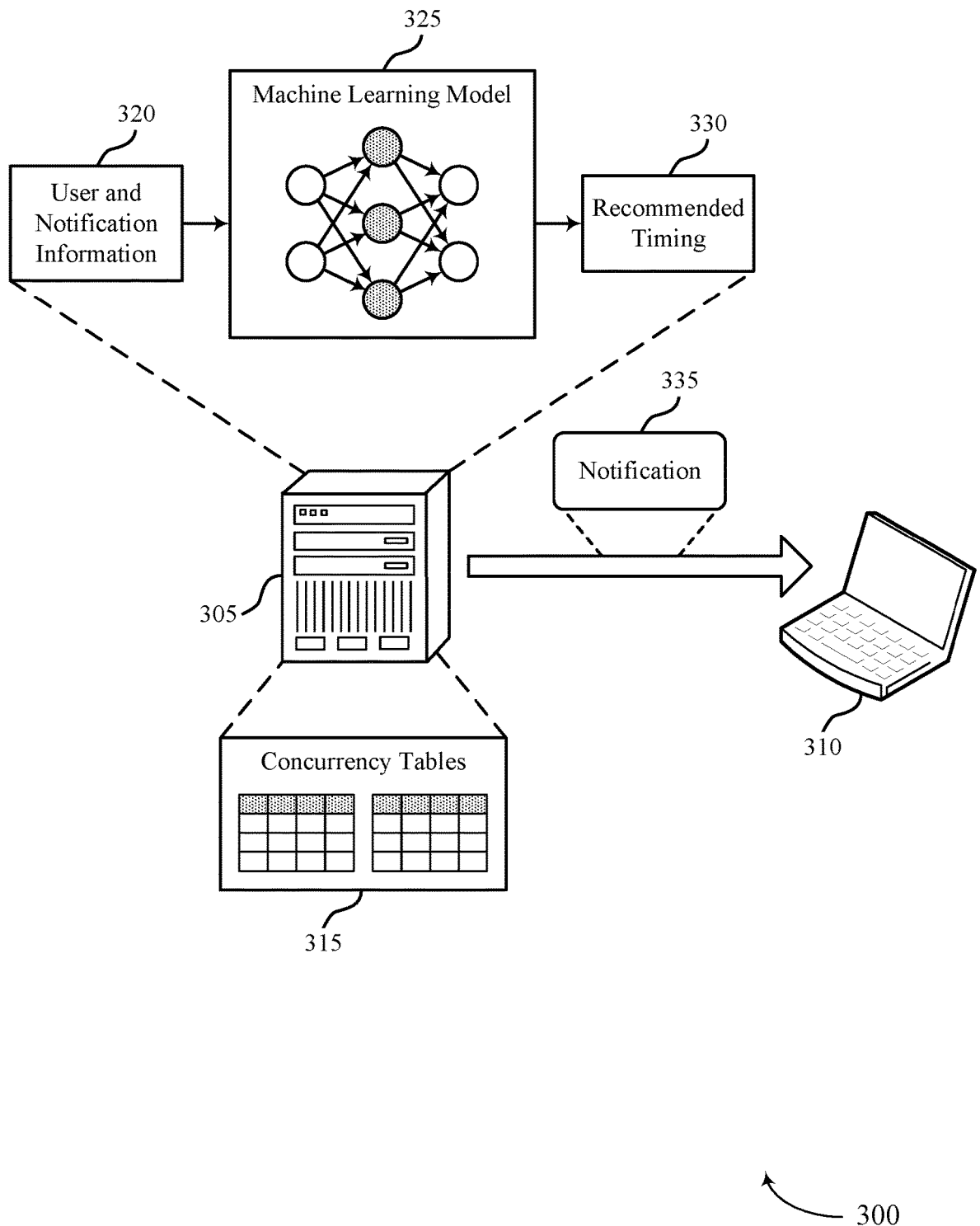

FIG. 3 illustrates an example of a group-based communication system 300 that supports determining notification timing in accordance with aspects of the present disclosure. The group-based communication system 300 may be an example of a group-based communication system 200, a system 100, or a combination thereof. The computing device 305 may support a group-based communication platform, such as a group-based communication platform 205. For example, the computing device 305 may be an example of an application server, a database server, a cloud-based server or service, a worker server, a server cluster, a virtual machine, a container, or any combination of these or other computing devices. The user device 310 may be an example of a user device 225, such as a laptop, a desktop computer, a tablet, a smart phone, a smart watch, a smart television, or any other user-operated device. The user device 310 may access a group-based communication application supporting the group-based communication platform. For example, a user operating the user device 310 may log into the group-based communication application, and the computing device 305 may send, for display in the user interface of the user device 310, information relating to the group-based communication platform, such as workspace information, channel information, direct messaging information, or the like. In some alternative examples, the user device 310 may host the group-based communication application locally at the user device 310, and one or more operations described herein with respect to the computing device 305 may alternatively be performed by the user device 310. The group-based communication system 300 may use techniques described herein to improve sending times for notifications 335 to increase user engagement with the group-based communication application.

The group-based communication system 300 (e.g., via a computing device 305) may support a variety of notifications 335, including email notifications, to nudge user engagement. Examples of email notifications may include a user invite reminder, a 24 hour reminder, a digest email, or any combination of these or other user-specific notifications 335. To improve user adoption of and engagement with the group-based communication system 300, the system may send such notifications 335 at an "optimal" time (e.g., a predicted or otherwise recommended time) for user engagement and activation. The group-based communication system 300 may use data from one or more concurrency tables 315 to determine the notification sending time. As an example, a concurrency table 315 may store "time spent by time by hour" information, for example, for a specific team of users corresponding to a workspace identifier. The group-based communication system 300 may determine a most-active hour for the team from the data in this concurrency table 315 and may send notifications 335 to users within this team during this most-active hour to optimize—or otherwise improve—engagement between team-members. Additionally or alternatively, the group-based communication system 300 may analyze data to determine notification sending times to improve open rates, click rates (e.g., click-through rates), or other types of user engagement.

In some examples, the group-based communication system 300 may additionally or alternatively determine the notification sending time based on user device types operated by users. For example, a first user device type (e.g., a laptop, a desktop computer) may support convenient viewing of messages, documents, files, or other information (e.g., based on the size of the user interface for the first user device type), while a second user device type (e.g., a mobile device, a smart watch) may fail to support convenient viewing of such information (e.g., based on the size of the user interface for the second user device type falling below a threshold size). In some cases, the group-based communication system 300 may analyze a user's active time relative to the type of user device 310 on which the user is active. As such, the group-based communication system 300 may determine to send a notification when a user is active—or expected to be active—on a user device 310 of the first user device type to increase the likelihood that the user may engage with the notification and view corresponding information (e.g., open and read documents) in the user interface of the user device 310 currently operated by the user.

The group-based communication system 300 (e.g., via the computing device 305) may determine the time for sending a notification 335 using a machine learning model 325, a heuristic, or some other technique for dynamically generating a time to send the notification 335. By using such techniques, the group-based communication system 300 may determine a time that is customized for a specific notification 335 (e.g., type of notification), user, channel, workspace, or any combination thereof. For example, the group-based communication system 300 may calculate a reminder time by owner, such that a user-specific reminder time is determined for a respective user of the group-based communication system 300.

In some examples, the group-based communication system 300 may use an iterative approach to determining notification sending times. For example, the group-based communication system 300 may test multiple heuristics, machine learning models 325 (e.g., using different sets of features, different cost functions, different metrics to optimize), or both. In some cases, the group-based communication system 300 may select a method (e.g., heuristic, machine learning model 325) to activate for use in the system. Additionally or alternatively, an administrative user may select the method to activate. In some cases, the selected method may change or be updated based on real-time or pseudo-realtime data (e.g., to further optimize the notification sending times).

In a specific example, the group-based communication system 300 may initially use a weight distribution heuristic around the most active times for a team of users (e.g., users corresponding to a same workspace identifier) according to one or more concurrency tables 315. The group-based communication system 300 may further track additional potential features for analysis and may receive feedback from users (e.g., opens, clicks, messages, or other user engagement information) for various notification send times. Such information may be used to train more advanced machine learning models 325. For example, the group-based communication system 300 may train a machine learning model 325 using user and notification information 320, which may include features of interest identified by the system or input a user (e.g., an administrative user).

In some cases, the group-based communication system 300 may use a regression model, survival analysis, or a combination thereof to determine a trained machine learning model 325. For example, based on user activity (e.g., activity data for a first user), team activity (e.g., activity data for a set of multiple users associated with a same workspace or channel as the first user), or both, the group-based communication system 300 may use a regression model to predict when a user is going to open or click through an email notification. Such a regression model and survival analysis may result in a machine learning model 325 that increases the percentage of users opening notifications 335 within a time duration (e.g., within an hour).

Additionally or alternatively, the group-based communication system 300 may use a classification model. The classification model may use notification time sent as a feature to predict whether a user will click-through a notification 335. The classification model may be further analyzed to determine the influence of a time opened feature (e.g., when a notification 335 is opened) as to the likelihood that the notification 335 is clicked through. In some examples, the classification model may predict the outcome (e.g., whether a user will click through a notification 335) using a send time feature valued from 1 to 24 (e.g., indicating 24 hour buckets) and may select the bucket (e.g., corresponding to an hour time window) with the highest predicted probability of resulting in the user clicking through the notification 335. This selected bucket may correspond to the recommended timing 330 for sending the notification 335 from the classification model. Such a classification model may result in a machine learning model 325 that increases the percentage of users clicking through notifications 335 within a time duration (e.g., within an hour).

In some cases, the group-based communication system 300 may use contextual bandit algorithms to determine the recommended timing 330 for sending notifications 335. For example, the group-based communication system 300 may iteratively test the effects of potential features on improving the machine learning model 325 (e.g., improving the likelihood that the recommended timing 330 output by the model results in increased user engagement). The iterative tests may generate information indicating how context vectors relate to rewards for the machine learning model 325, and the group-based communication system 300 may further tune the machine learning model 325—and, in some cases, the input features-based on this information.

Additional or alternative machine learning techniques may be used by the group-based communication system 300. For example, the group-based communication system 300 may use a neural network to determine a recommended timing 330 based on user and notification information 320 (e.g., a set of features corresponding to the user, the notification, or both). In some cases, the neural network may be an example of a feed forward (FF) or deep feed forward (DFF) neural network, a recurrent neural network (RNN), a long/short term memory (LSTM) neural network, or any other type of neural network.

The group-based communication system 300 may use any number of features to train the machine learning model 325. In some cases, the group-based communication system 300 may iteratively test additional or alternative features to determine how the features affect the accuracy of the machine learning model 325. The group-based communication system 300 may leverage the significant quantity of notifications 335 (e.g., thousands of daily notifications) to test features and train or retrain machine learning models 325. In some cases, the group-based communication system 300 may refrain from deploying a new machine learning model 325 for notification time determination until the model has reached a threshold confidence metric. Additionally or alternatively, the group-based communication system 300 may enforce one or more rules to ensure a new model follows specific parameters. For example, a rule may ensure that notifications 335 are not sent more than a threshold time (e.g., 2 hours) outside of typical operating hours for a user or organization (e.g., workspace). The group-based communication system 300 may monitor the distribution of send times for notifications 335 to detect any outliers or biases.

The group-based communication system 300 may train the machine learning model 325 using concurrency data from the concurrency tables 315 (e.g., data indicating when users are concurrently active in the group-based communication platform). In some examples, the group-based communication system 300 may access and aggregate concurrency data for a specific time window (e.g., the last seven days, to support up-to-date timing optimization). The group-based communication system 300 may use a vector with 24 elements (e.g., corresponding to the 24 hour buckets in the concurrency tables 315) to indicate active minutes in each hour bucket for a user (e.g., the target of a notification) and a vector with 24 elements to indicate active minutes in each hour bucket for a team (e.g., by aggregating across user identifiers corresponding to a same channel identifier or a same workspace identifier). In some cases, the group-based communication system 300 may calculate percentages of the total active time for the different hour buckets (e.g., 20% of a user's active time is in the 10 a.m. to 11 a.m. hour bucket). Such vectors may be used as features to train the machine learning model 325 to increase the likelihood a notification 335 is sent to a user when the user is active in the group-based communication system 300 and when other users on the same team as the user are active in the group-based communication system 300.

Other potential features which may be used to train one or more machine learning models 325 include a team size, a country in which a team is located, a time of creation for a team, a segment within a team, a milestone for a team, whether a team is qualified, engaged, or paid, or any combination thereof. The team may refer to a set of users who are members of a same channel, a same direct messaging group, a same workspace, a same meeting, or some combination thereof. Additional or alternative potential features may be associated with the specific user to which the notification 335 is to be sent, the notification 335 itself, or both. For example, potential features may include the user's role in an organization, the user's work shift or active hours, the user's location (e.g., time zone), the user's closest contacts within the team, user-specific settings (e.g., a user-input time or time window for notifications or for no communications), the type of user device 310 operated by the user, the type of notification 335, the contents of the notification 335, any other recipients of a notification 335, or any combination of these or other user-specific or notification-specific features. In some examples, other application information may additionally be tracked. For example, the active time may be tracked for email applications or other applications, which may improve the likelihood that a user receives and views the notification 335.

The group-based communication system 300 may use embedding functions (e.g., parsec embedding) to embed a set of features—or potential features—into a vector space. In some cases, the group-based communication system 300 may use a semantic-based embedding to capture user profile information for predicting a user's activity schedule. In some examples, the group-based communication system 300 may perform dimension reduction (e.g., if using a linear model) or may use deep learning models for vectors with multiple dimensions. Additionally or alternatively, the group-based communication system 300 may perform vector embedding to capture team information. Using the resulting vectors, the system may input the vectors (e.g., indicating the user and notification information 320 in vector form) into one or more machine learning models 325 to train the machine learning models, for example, based on a cost function, or otherwise based on feedback information (e.g., user engagement information). The group-based communication system 300 may train one or more machine learning models 325 until a machine learning model 325 meets a confidence threshold. The system may deploy this machine learning model 325 for handling notification timing. For example, if the group-based communication system 300 identifies a notification 335 to send to a user, the group-based communication system 300 may generate a vector based on the notification 335, the user, the user's team, or some combination thereof. The group-based communication system 300 may input the generated vector into the trained and deployed machine learning model 325, and the model may output an indication of a recommended timing 330 based on the information embedded in the vector. The group-based communication system 300 may send the notification 335 to the user (e.g., to the user device 310 for display in a user interface) at the recommended timing 330.

Figure 4:
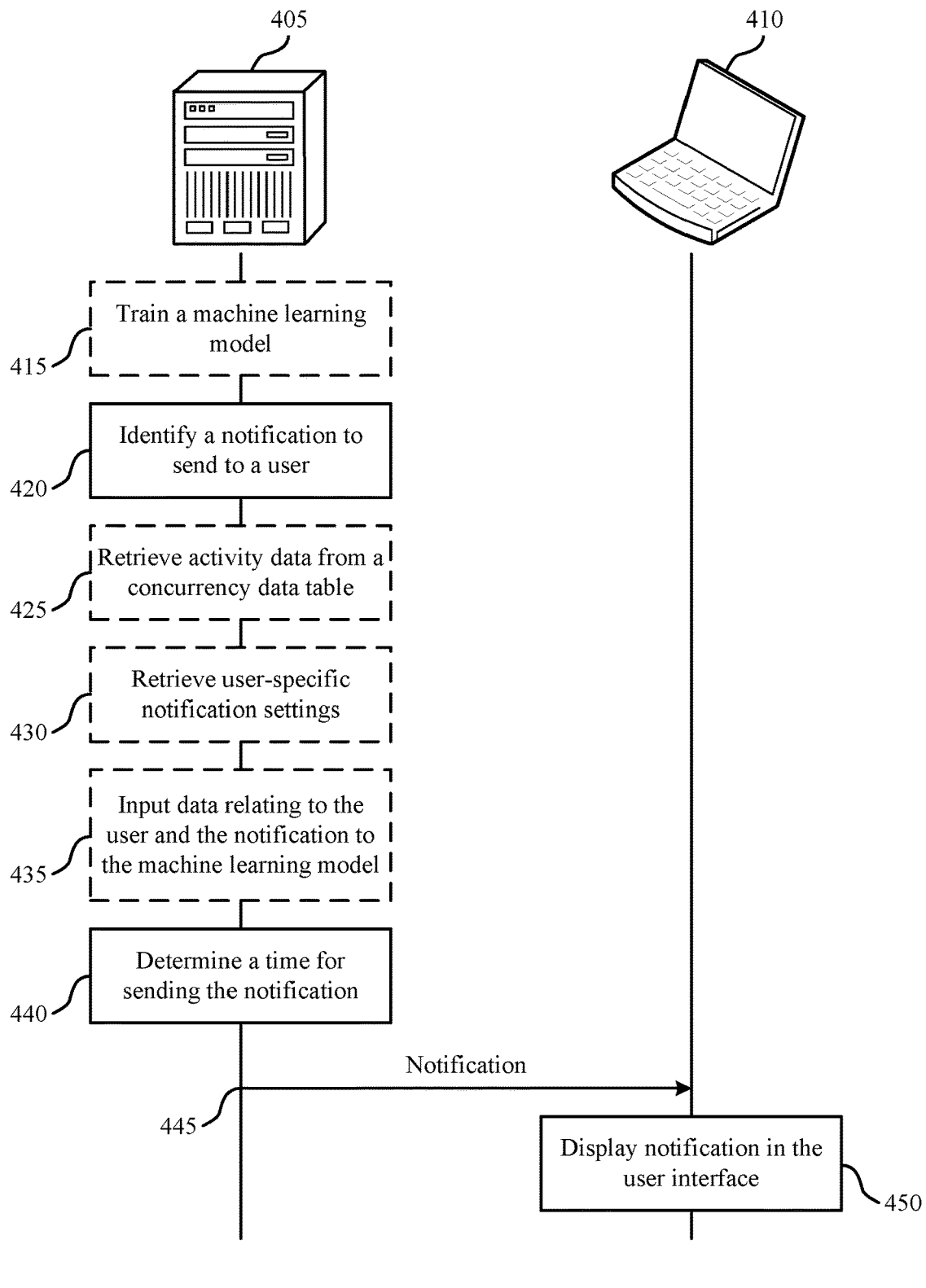
FIG. 4 illustrates an example of a process flow that supports determining notification timing in a group-based communication system in accordance with aspects of the present disclosure.

FIG. 4 illustrates an example of a process flow 400 that supports determining notification timing in a group-based communication system in accordance with aspects of the present disclosure. The process flow 400 may be implemented by a group-based communication system including one or more computing devices 405 and one or more user devices 410. The computing device 405 may host a group-based communication platform. The user device 410 may access the group-based communication platform over a network, based on downloading an application, or both. The user device 410 may include user interfaces that can display information corresponding to the group-based communication platform, as described herein with reference to FIGS. 1 through 3. Alternative examples of the following may be implemented, where some processes are performed in a different order than described or are not performed at all. In some examples, processes may include additional features not mentioned below, or further processes may be added. Additionally or alternatively, operations described herein with reference to the computing device 405 may instead be performed by the user device 410.

In some examples, at 415, the computing device 405 may train a machine learning model to determine notification sending times. The machine learning model may be an example of a machine learning model 325 described with reference to FIG. 3. In some cases, the computing device 405 may additionally or alternatively use a heuristic. The computing device 405 may train the model using a set of features, such as first activity data for a user receiving a notification, second activity data for a set of users associated with a same workspace identifier as the user, a type of workspace corresponding to the workspace identifier, a size of the workspace, a country associated with the workspace, a time of creation associated with the notification, a time zone associated with the user, or any combination of these or other potential features associated with notifications. The computing device 405 may deploy the trained machine learning model for use in determining notification sending times.

At 420, the computing device 405 may identify a notification to send to a user of the group-based communication system. The user may be associated with a user identifier and a workspace identifier within the group-based communication system. Additionally or alternatively, the user may be associated with one or more channel identifiers.

At 425, the computing device 405 may retrieve activity data from a concurrency data table. For example, the computing device 405 may retrieve first activity data for the user, second activity data for multiple users on a team with the user (e.g., associated with the same workspace identifier, channel identifier, or both as the user), or both from the concurrency data table. The concurrency data table may store, for multiple user identifiers, respective workspace identifiers and respective amounts of time spent active in the group-based communication system by a user for a set of multiple time periods (e.g., specific hours, half-hour time periods, or any other segments of time).

At 430, the computing device 405 may retrieve user-specific notification settings. For example, the computing device 405 may retrieve one or more notification settings for the user, such as a time window for receiving notifications, a time window during which the user does not wish to receive notifications, or any other user-specific settings.

At 435, the computing device 405 may input data relating to the user, the notification, or both into the deployed machine learning model. For example, the data may be input as an embedded vector. The data may include the first activity data, the second activity data, or any combination of this data or any other data relating to features for the machine learning model. In some examples, the first activity data, the second activity data, or both may indicate an amount of time that a respective user is active in the group-based communication system based on a click performed by the user, scrolling performed by the user, typing performed by the user, switching channels performed by the user, an application programming interface (API) call performed responsive to an input by the user, or any combination thereof.

At 440, the computing device 405 may determine a time for sending the notification. In some cases, the deployed machine learning model may output an indication of the time for sending the notification (e.g., in response to the input vector). The computing device 405 may determine the time for sending the notification (e.g., a reminder) based on the first activity data indicating user activity in the group-based communication system for the user corresponding to the user identifier and second activity data indicating user activity in the group-based communication system for multiple other users corresponding to the workspace identifier (e.g., a team of users). Additionally or alternatively, the computing device 405 may determine the time for sending the notification (e.g., a digest email) to the user based on the first activity data, or the computing device 405 may determine the time for sending the notification (e.g., a direct message to a second user or a reminder relating to a direct message to the second user) based on the first activity data, third activity data indicating user activity in the group-based communication system for the second user, or both. In some cases, the computing device 405 may determine the time for sending the notification based on an optimization of an open rate for the notification, an optimization of a click rate for the notification, an optimization of user engagement within the group-based communication system, an optimization of user interactions within a team (e.g., within a workspace) in the group-based communication system, or any combination thereof.

At 445, the computing device 405 may send the notification at the determined time. For example, the computing device 405 may send the notification for display in a user interface of a user device 410 corresponding to (e.g., operated by) the user. The user device 410 may display the notification in the user interface at 450. In some examples, the notification may be an example of an email message including a notification (e.g., a reminder, a digest), and the email message may be sent to an email application for display in the user interface. For example, the notification may be an invitation reminder for a group-based communication channel in the group-based communication system, an invitation reminder for a meeting scheduled in the group-based communication system, a user-defined reminder in the group-based communication system, or any combination thereof. The techniques described herein may improve the likelihood that the user receiving the notification opens the notification, clicks through the notification, engages with the group-based communication system, communicates with one or more other users in the group-based communication system, or any combination thereof.

Figure 5:
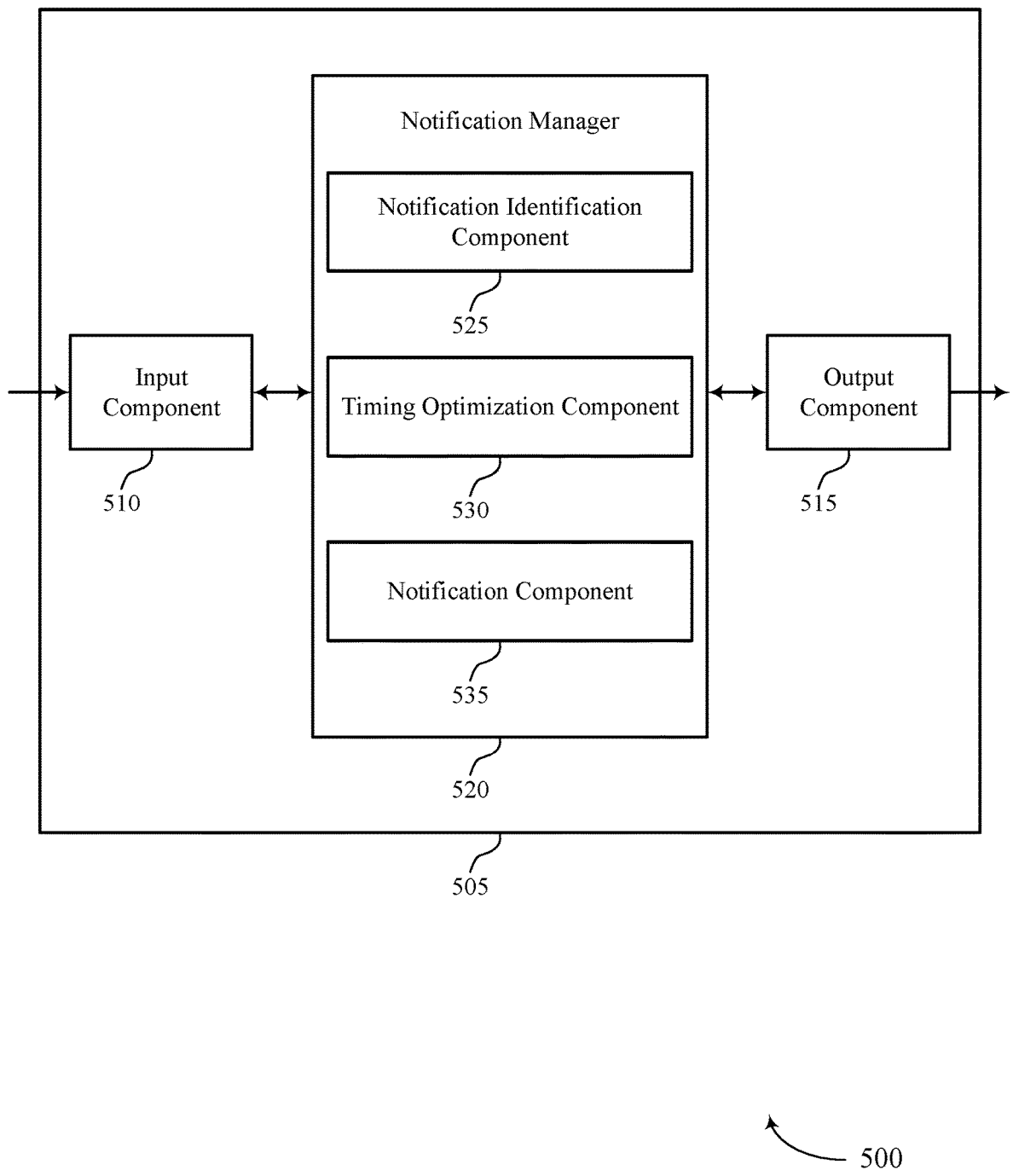
FIG. 5 shows a block diagram of an apparatus that supports determining notification timing in a group-based communication system in accordance with aspects of the present disclosure.

FIG. 5 shows a block diagram 500 of a device 505 that supports determining notification timing in a group-based communication system in accordance with aspects of the present disclosure. The device 505 may include an input component 510, an output component 515, and a notification manager 520. The device 505 may also include a processor. Each of these components may be in communication with one another (e.g., via one or more buses).

The input component 510 may manage input signals for the device 505. For example, the input component 510 may identify input signals based on an interaction with a modem, a keyboard, a mouse, a touchscreen, or a similar device. These input signals may be associated with user input or processing at other components or devices. In some cases, the input component 510 may utilize an operating system such as iOS®, ANDROID®, MS-DOS®, MS-WINDOWS®, OS/2®, UNIX®, LINUX®, or another known operating system to handle input signals. The input component 510 may send aspects of these input signals to other components of the device 505 for processing. For example, the input component 510 may transmit input signals to the notification manager 520 to support notification timing in a group-based communication system. In some cases, the input component 510 may be a component of an input/output (I/O) controller 710 as described with reference to FIG. 7.

The output component 515 may manage output signals for the device 505. For example, the output component 515 may receive signals from other components of the device 505, such as the notification manager 520, and may transmit these signals to other components or devices. In some examples, the output component 515 may transmit output signals for display in a user interface, for storage in a database or data store, for further processing at a server or server cluster, or for any other processes at any number of devices or systems. In some cases, the output component 515 may be a component of an I/O controller 710 as described with reference to FIG. 7.

The notification manager 520 may include a notification identification component 525, a timing optimization component 530, a notification component 535, or any combination thereof. In some examples, the notification manager 520, or various components thereof, may be configured to perform various operations (e.g., receiving, monitoring, transmitting) using or otherwise in cooperation with the input component 510, the output component 515, or both. For example, the notification manager 520 may receive information from the input component 510, send information to the output component 515, or be integrated in combination with the input component 510, the output component 515, or both to receive information, transmit information, or perform various other operations as described herein.

The notification manager 520 may support determining notification timing in a group-based communication system in accordance with examples as disclosed herein. The notification identification component 525 may be configured as or otherwise support a means for identifying a notification to send to a user of the group-based communication system, the user associated with a user identifier and a workspace identifier in the group-based communication system. The timing optimization component 530 may be configured as or otherwise support a means for determining a time for sending the notification based on first activity data indicating user activity in the group-based communication system for the user corresponding to the user identifier and second activity data indicating user activity in the group-based communication system for a set of multiple users corresponding to the workspace identifier. The notification component 535 may be configured as or otherwise support a means for sending the notification for display in a user interface of a user device corresponding to the user based on the determined time.

Figure 6:
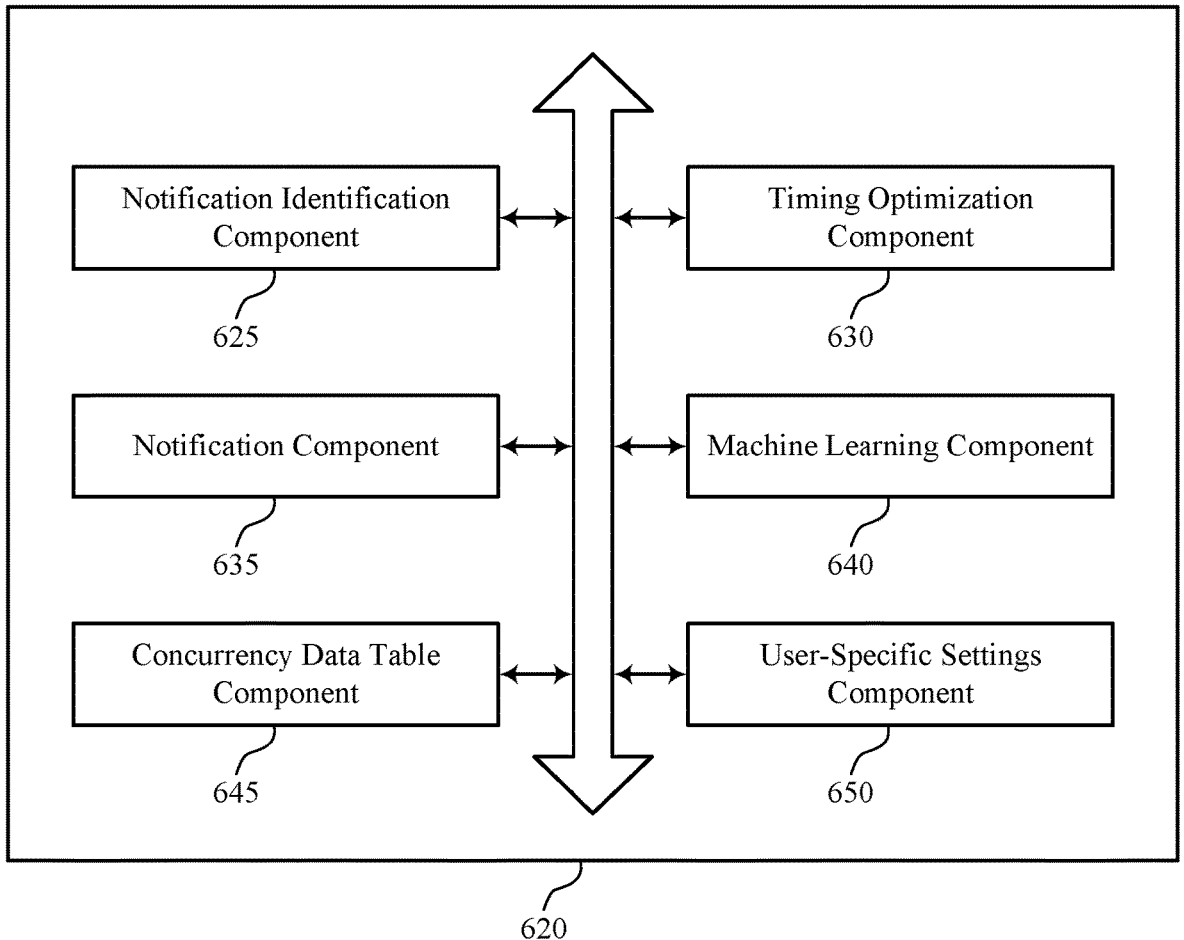
FIG. 6 shows a block diagram of a notification manager that supports determining notification timing in a group-based communication system in accordance with aspects of the present disclosure.

FIG. 6 shows a block diagram 600 of a notification manager 620 that supports determining notification timing in a group-based communication system in accordance with aspects of the present disclosure. The notification manager 620 may be an example of aspects of a group-based communication system, a group-based communication platform, a notification manager 520, or any combination thereof as described herein. The notification manager 620, or various components thereof, may be an example of means for performing various aspects of determining notification timing in a group-based communication system as described herein. For example, the notification manager 620 may include a notification identification component 625, a timing optimization component 630, a notification component 635, a machine learning component 640, a concurrency data table component 645, a user-specific settings component 650, or any combination thereof. Each of these components may communicate, directly or indirectly, with one another (e.g., via one or more buses).

The notification manager 620 may support determining notification timing in a group-based communication system in accordance with examples as disclosed herein. The notification identification component 625 may be configured as or otherwise support a means for identifying a notification to send to a user of the group-based communication system, the user associated with a user identifier and a workspace identifier in the group-based communication system. The timing optimization component 630 may be configured as or otherwise support a means for determining a time for sending the notification based on first activity data indicating user activity in the group-based communication system for the user corresponding to the user identifier and second activity data indicating user activity in the group-based communication system for a set of multiple users corresponding to the workspace identifier. The notification component 635 may be configured as or otherwise support a means for sending the notification for display in a user interface of a user device corresponding to the user based on the determined time.

In some examples, to support sending the notification, the notification component 635 may be configured as or otherwise support a means for sending an email message including the notification to an email application for display in the user interface.

In some examples, the machine learning component 640 may be configured as or otherwise support a means for training a machine learning model using the first activity data, the second activity data, or both, where the trained machine learning model outputs the time for sending the notification. In some examples, the machine learning component 640 may be configured as or otherwise support a means for inputting one or more additional features to the machine learning model for the training, where the one or more additional features includes a type of workspace corresponding to the workspace identifier, a size of the workspace, a country associated with the workspace, a time of creation associated with the notification, a time zone associated with the user, or any combination thereof.

In some examples, the concurrency data table component 645 may be configured as or otherwise support a means for retrieving the first activity data, the second activity data, or both from a concurrency data table, where the concurrency data table stores, for a set of multiple user identifiers, a respective workspace identifier and respective amounts of time spent active in the group-based communication system for a set of multiple time periods.

In some examples, the time for sending the notification is determined based on an optimization of an open rate for the notification, a click rate for the notification, or both. In some examples, the first activity data, the second activity data, or both indicates an amount of time that a respective user is active in the group-based communication system based on a click performed by the user, scrolling performed by the user, typing performed by the user, switching channels performed by the user, an API call performed responsive to an input by the user, or any combination thereof. In some examples, the user-specific settings component 650 may be configured as or otherwise support a means for retrieving one or more notification settings for the user, where the time for sending the notification is further based on the one or more notification settings for the user.

In some examples, the notification includes a first invitation reminder for a group-based communication channel in the group-based communication system, a second invitation reminder for a meeting scheduled in the group-based communication system, a user-defined reminder in the group-based communication system by the user, or any combination thereof.

In some examples, the timing optimization component 630 may be configured as or otherwise support a means for determining a second time for sending a digest email to the user based on the first activity data or a direct message to a second user based on third activity data indicating user activity in the group-based communication system for the second user.

Figure 7:
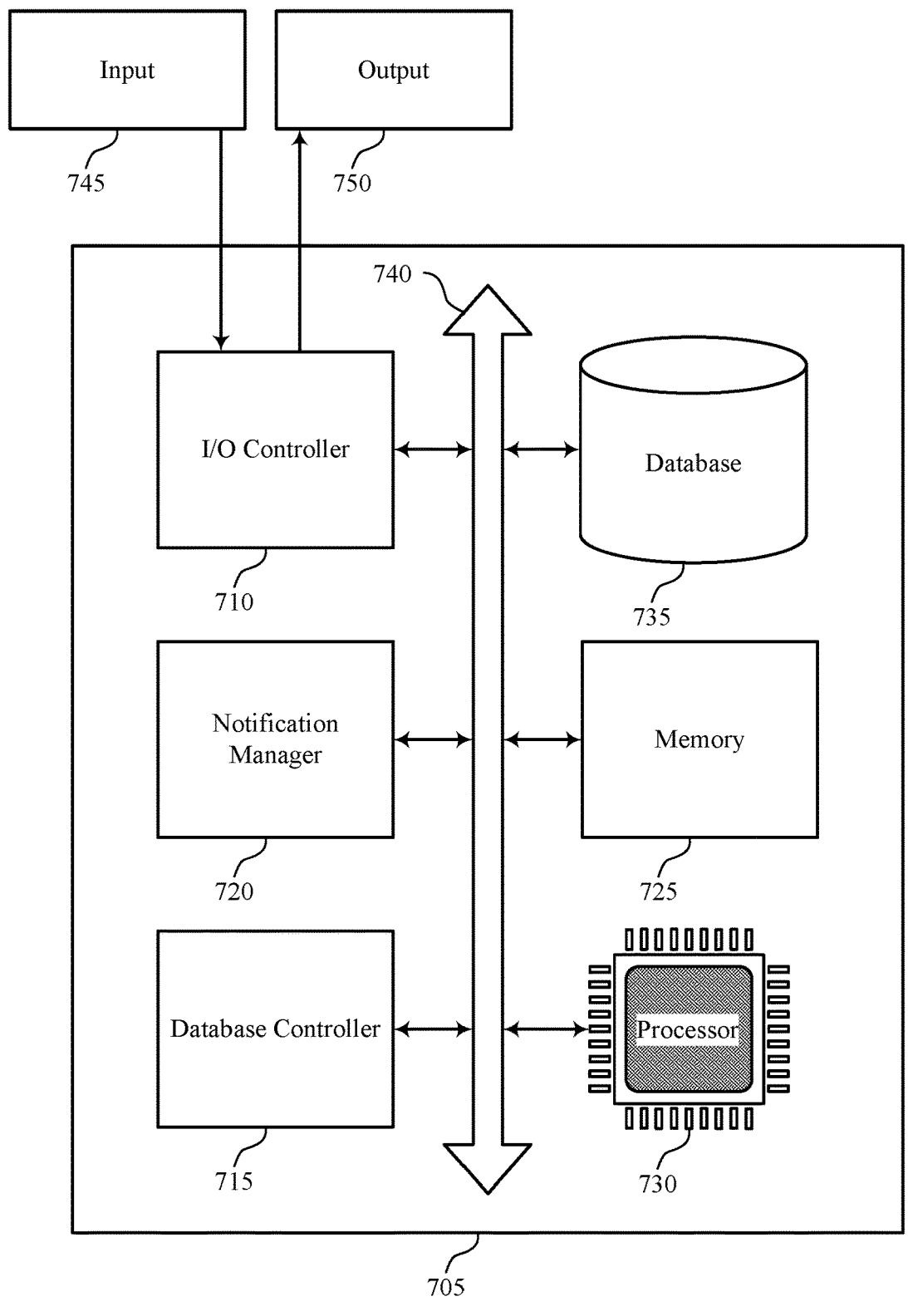
FIG. 7 shows a diagram of a system including a device that supports determining notification timing in a group-based communication system in accordance with aspects of the present disclosure.

FIG. 7 shows a diagram of a system 700 including a device 705 that supports determining notification timing in a group-based communication system in accordance with aspects of the present disclosure. The device 705 may be an example of or include the components of a device 505 as described herein. For example, the device 705 may be an example or component of a group-based communication system, a group-based communication platform, one or more computing devices, one or more databases, or any combination thereof. The device 705 may include components for bi-directional data communications including components for transmitting and receiving communications, such as a notification manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor 730 to perform various functions described herein. In some cases, the memory 725 may contain, among other things, a basic I/O system (BIOS) which may control basic hardware or software operation such as the interaction with peripheral components or devices.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting determining notification timing in a group-based communication system).

The notification manager 720 may support determining notification timing in a group-based communication system in accordance with examples as disclosed herein. For example, the notification manager 720 may be configured as or otherwise support a means for identifying a notification to send to a user of the group-based communication system, the user associated with a user identifier and a workspace identifier in the group-based communication system. The notification manager 720 may be configured as or otherwise support a means for determining a time for sending the notification based on first activity data indicating user activity in the group-based communication system for the user corresponding to the user identifier and second activity data indicating user activity in the group-based communication system for a set of multiple users corresponding to the workspace identifier. The notification manager 720 may be configured as or otherwise support a means for sending the notification for display in a user interface of a user device corresponding to the user based on the determined time.

Figure 8:
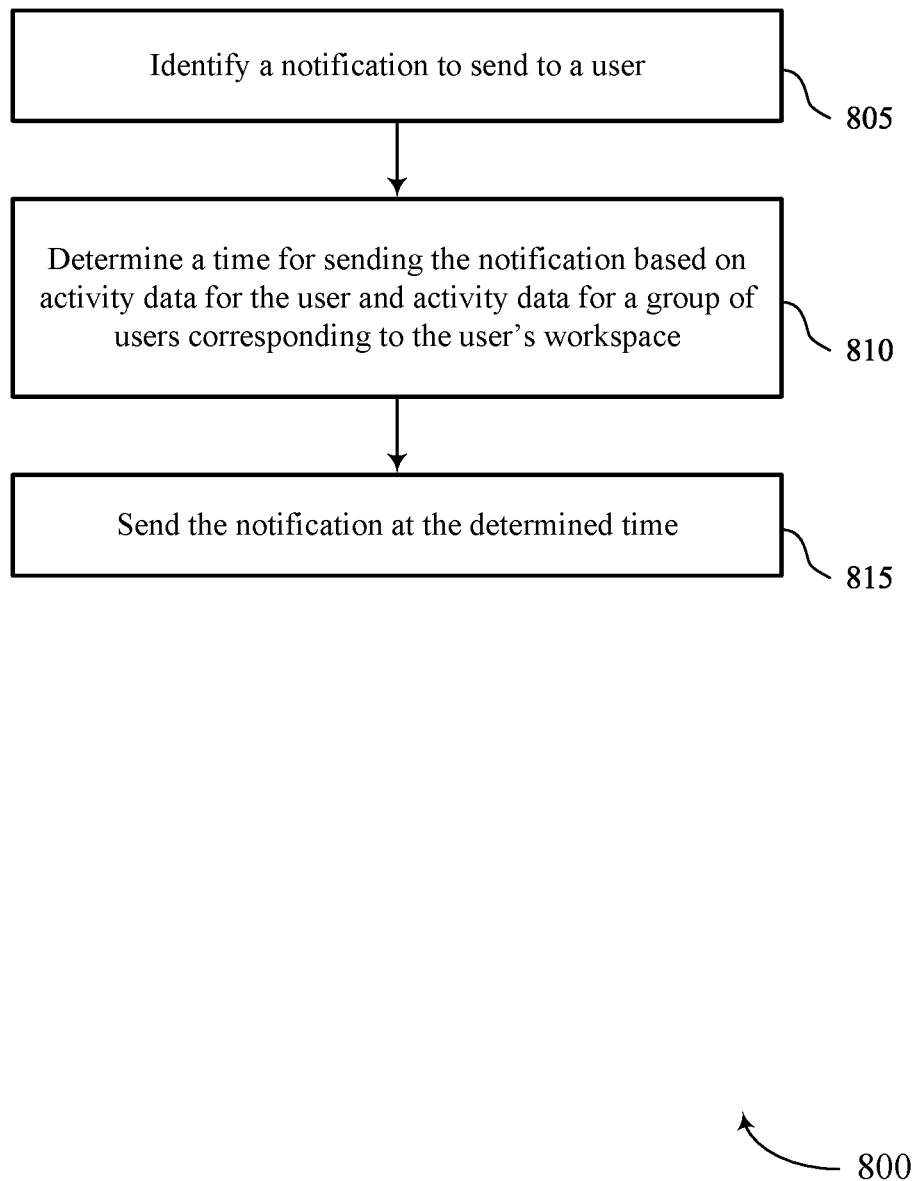
FIGS. 8 and 9 show flowcharts illustrating methods that support determining notification timing in a group-based communication system in accordance with aspects of the present disclosure.

FIG. 8 shows a flowchart illustrating a method 800 that supports determining notification timing in a group-based communication system in accordance with aspects of the present disclosure. The operations of the method 800 may be implemented by a group-based communication system or its components (e.g., a computing device, such as an application server, a database server, a cloud-based server or service, a worker server, a server cluster, a virtual machine, a container, or any combination of these or other computing devices) as described herein. For example, the operations of the method 800 may be performed by a group-based communication system as described with reference to FIGS. 1 through 7. In some examples, a group-based communication system may execute a set of instructions to control the functional elements of the group-based communication system to perform the described functions. Additionally or alternatively, the group-based communication system may perform aspects of the described functions using special-purpose hardware.

At 805, the method may include identifying a notification to send to a user of a group-based communication system. The user may be associated with a user identifier and a workspace identifier in the group-based communication system. The operations of 805 may be performed in accordance with examples as disclosed herein. In some examples, aspects of the operations of 805 may be performed by a notification identification component 625 as described with reference to FIG. 6.

At 810, the method may include determining a time for sending the notification based on activity data. For example, determining the time may be based on first activity data indicating user activity in the group-based communication system for the user corresponding to the user identifier and second activity data indicating user activity in the group-based communication system for a set of multiple users corresponding to the workspace identifier. The operations of 810 may be performed in accordance with examples as disclosed herein. In some examples, aspects of the operations of 810 may be performed by a timing optimization component 630 as described with reference to FIG. 6.

At 815, the method may include sending the notification for display in a user interface of a user device corresponding to the user based on the determined time. The operations of 815 may be performed in accordance with examples as disclosed herein. In some examples, aspects of the operations of 815 may be performed by a notification component 635 as described with reference to FIG. 6.

Figure 9:
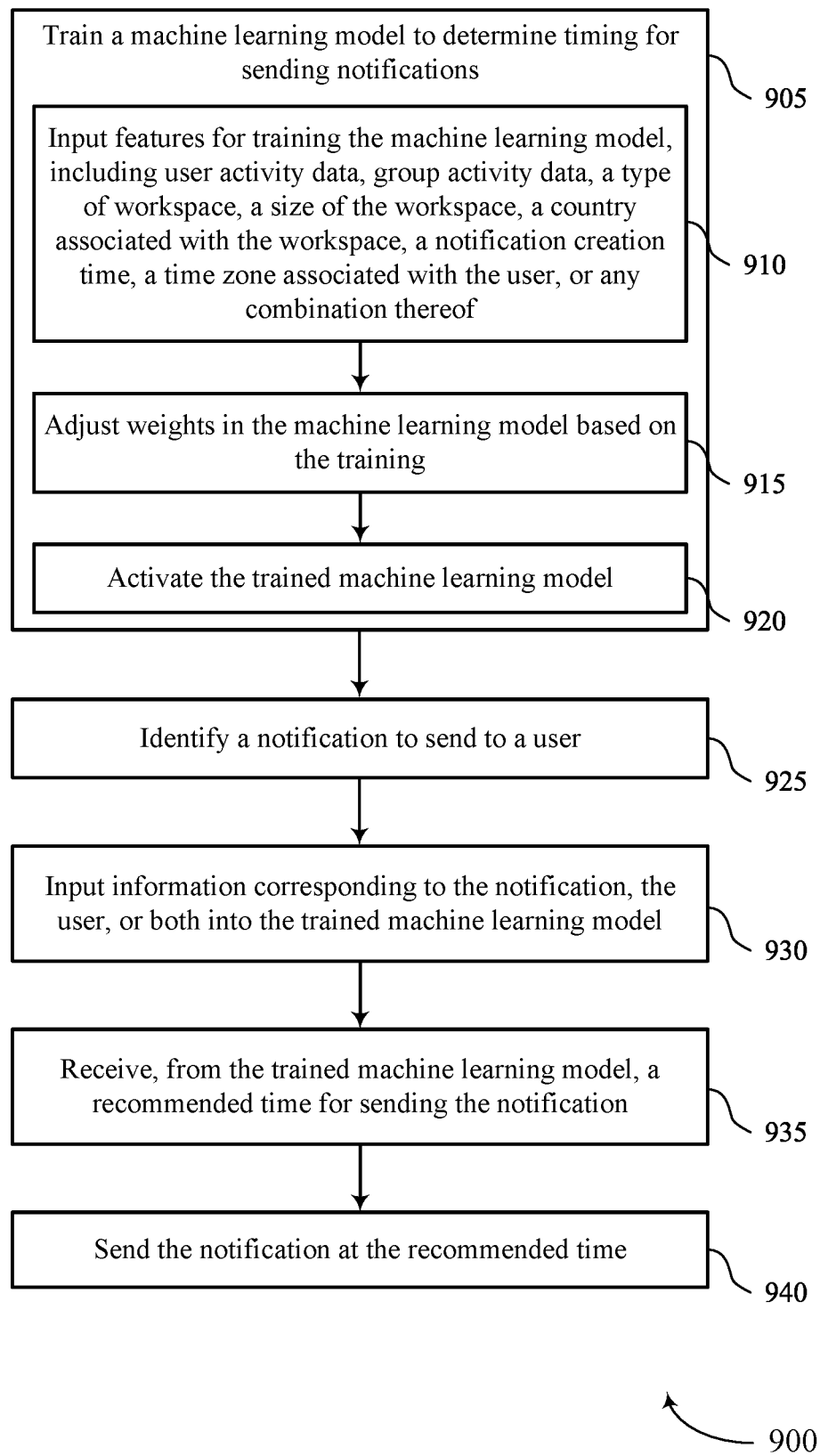

FIG. 9 shows a flowchart illustrating a method 900 that supports determining notification timing in a group-based communication system in accordance with aspects of the present disclosure. The operations of the method 900 may be implemented by a group-based communication system or its components (e.g., a computing device, such as an application server, a database server, a cloud-based server or service, a worker server, a server cluster, a virtual machine, a container, or any combination of these or other computing devices) as described herein. For example, the operations of the method 900 may be performed by a group-based communication system as described with reference to FIGS. 1 through 7. In some examples, a group-based communication system may execute a set of instructions to control the functional elements of the group-based communication system to perform the described functions. Additionally or alternatively, the group-based communication system may perform aspects of the described functions using special-purpose hardware.

At 905, the method may include training a machine learning model to output a time for sending a notification in a group-based communication system. The operations of 905 may be performed in accordance with examples as disclosed herein. In some examples, aspects of the operations of 905 may be performed by a machine learning component 640 as described with reference to FIG. 6.

In some examples, at 910, training the machine learning model may involve inputting one or more features to the machine learning model for training. The features may include first activity data indicating user activity in the group-based communication system for a user, second activity data indicating user activity in the group-based communication system for a set of multiple users, a type of workspace, a size of the workspace, a country associated with the workspace, a time of creation associated with a notification, a time zone associated with the user, or any combination thereof. The operations of 910 may be performed in accordance with examples as disclosed herein. In some examples, aspects of the operations of 910 may be performed by a machine learning component 640 as described with reference to FIG. 6.

In some examples, at 915, training the machine learning model may involve adjusting weights in the machine learning model based on the training. For example, the machine learning model may be tuned to optimize the output timing for sending notifications based on the input features. The operations of 915 may be performed in accordance with examples as disclosed herein. In some examples, aspects of the operations of 915 may be performed by a machine learning component 640 as described with reference to FIG. 6.

In some examples, at 920, the method may include activating the trained machine learning model. Upon activation of the machine learning model, the group-based communication system may use the trained machine learning model to determine timing for sending notifications to users of the group-based communication system. The operations of 920 may be performed in accordance with examples as disclosed herein. In some examples, aspects of the operations of 920 may be performed by a machine learning component 640 as described with reference to FIG. 6.

At 925, the method may include identifying a notification to send to a user of the group-based communication system. The user may be associated with a user identifier and a workspace identifier in the group-based communication system. The operations of 925 may be performed in accordance with examples as disclosed herein. In some examples, aspects of the operations of 925 may be performed by a notification identification component 625 as described with reference to FIG. 6.

At 930, the method may include inputting information corresponding to the notification, the user, or both into the trained machine learning model. For example, the method may include inputting, to the machine learning model, first activity data indicating user activity in the group-based communication system for the user, second activity data indicating user activity in the group-based communication system for a set of multiple users corresponding to the workspace identifier, a type of workspace, a size of the workspace, a country associated with the workspace, a time of creation associated with the notification, a time zone associated with the user, or any combination thereof. The operations of 930 may be performed in accordance with examples as disclosed herein. In some examples, aspects of the operations of 930 may be performed by a timing optimization component 630 as described with reference to FIG. 6.

At 935, the method may include receiving, as an output of the machine learning model, a recommended time for sending the notification. The operations of 935 may be performed in accordance with examples as disclosed herein. In some examples, aspects of the operations of 935 may be performed by a timing optimization component 630 as described with reference to FIG. 6.

At 940, the method may include sending the notification for display in a user interface of a user device corresponding to the user based on the recommended time. The operations of 940 may be performed in accordance with examples as disclosed herein. In some examples, aspects of the operations of 940 may be performed by a notification component 635 as described with reference to FIG. 6.

A method for determining notification timing in a group-based communication system is described. The method may include identifying a notification to send to a user of the group-based communication system, the user associated with a user identifier and a workspace identifier in the group-based communication system, determining a time for sending the notification based on first activity data indicating user activity in the group-based communication system for the user corresponding to the user identifier and second activity data indicating user activity in the group-based communication system for a set of multiple users corresponding to the workspace identifier, and sending the notification for display in a user interface of a user device corresponding to the user based on the determined time.

An apparatus for determining notification timing in a group-based communication system is described. The apparatus may include a processor, memory coupled with the processor, and instructions stored in the memory. The instructions may be executable by the processor to cause the apparatus to identify a notification to send to a user of the group-based communication system, the user associated with a user identifier and a workspace identifier in the group-based communication system, determine a time for sending the notification based on first activity data indicating user activity in the group-based communication system for the user corresponding to the user identifier and second activity data indicating user activity in the group-based communication system for a set of multiple users corresponding to the workspace identifier, and send the notification for display in a user interface of a user device corresponding to the user based on the determined time.

Another apparatus for determining notification timing in a group-based communication system is described. The apparatus may include means for identifying a notification to send to a user of the group-based communication system, the user associated with a user identifier and a workspace identifier in the group-based communication system, means for determining a time for sending the notification based on first activity data indicating user activity in the group-based communication system for the user corresponding to the user identifier and second activity data indicating user activity in the group-based communication system for a set of multiple users corresponding to the workspace identifier, and means for sending the notification for display in a user interface of a user device corresponding to the user based on the determined time.

A non-transitory computer-readable medium storing code for determining notification timing in a group-based communication system is described. The code may include instructions executable by a processor to identify a notification to send to a user of the group-based communication system, the user associated with a user identifier and a workspace identifier in the group-based communication system, determine a time for sending the notification based on first activity data indicating user activity in the group-based communication system for the user corresponding to the user identifier and second activity data indicating user activity in the group-based communication system for a set of multiple users corresponding to the workspace identifier, and send the notification for display in a user interface of a user device corresponding to the user based on the determined time.

In some examples of the method, apparatuses, and non-transitory computer-readable medium described herein, sending the notification may include operations, features, means, or instructions for sending an email message including the notification to an email application for display in the user interface.

Some examples of the method, apparatuses, and non-transitory computer-readable medium described herein may further include operations, features, means, or instructions for training a machine learning model using the first activity data, the second activity data, or both, where the trained machine learning model outputs the time for sending the notification.

Some examples of the method, apparatuses, and non-transitory computer-readable medium described herein may further include operations, features, means, or instructions for inputting one or more additional features to the machine learning model for the training, where the one or more additional features includes a type of workspace corresponding to the workspace identifier, a size of the workspace, a country associated with the workspace, a time of creation associated with the notification, a time zone associated with the user, or any combination thereof.

Some examples of the method, apparatuses, and non-transitory computer-readable medium described herein may further include operations, features, means, or instructions for retrieving the first activity data, the second activity data, or both from a concurrency data table, where the concurrency data table stores, for a set of multiple user identifiers, a respective workspace identifier and respective amounts of time spent active in the group-based communication system for a set of multiple time periods.

In some examples of the method, apparatuses, and non-transitory computer-readable medium described herein, the time for sending the notification may be determined based on an optimization of an open rate for the notification, a click rate for the notification, or both.

In some examples of the method, apparatuses, and non-transitory computer-readable medium described herein, the first activity data, the second activity data, or both indicates an amount of time that a respective user may be active in the group-based communication system based on a click performed by the user, scrolling performed by the user, typing performed by the user, switching channels performed by the user, an API call performed responsive to an input by the user, or any combination thereof.

Some examples of the method, apparatuses, and non-transitory computer-readable medium described herein may further include operations, features, means, or instructions for retrieving one or more notification settings for the user, where the time for sending the notification may be further based on the one or more notification settings for the user.

In some examples of the method, apparatuses, and non-transitory computer-readable medium described herein, the notification includes a first invitation reminder for a group-based communication channel in the group-based communication system, a second invitation reminder for a meeting scheduled in the group-based communication system, a user-defined reminder in the group-based communication system by the user, or any combination thereof.

Some examples of the method, apparatuses, and non-transitory computer-readable medium described herein may further include operations, features, means, or instructions for determining a second time for sending a digest email to the user based on the first activity data or a direct message to a second user based on third activity data indicating user activity in the group-based communication system for the second user.

The following provides an overview of aspects of the present disclosure:

Aspect 1: A method for determining notification timing in a group-based communication system, comprising: identifying a notification to send to a user of the group-based communication system, the user associated with a user identifier and a workspace identifier in the group-based communication system; determining a time for sending the notification based at least in part on first activity data indicating user activity in the group-based communication system for the user corresponding to the user identifier and second activity data indicating user activity in the group-based communication system for a plurality of users corresponding to the workspace identifier; and sending the notification for display in a user interface of a user device corresponding to the user based at least in part on the determined time.

Aspect 2: The method of aspect 1, wherein sending the notification comprises: sending an email message comprising the notification to an email application for display in the user interface.

Aspect 3: The method of any of aspects 1 through 2, further comprising: training a machine learning model using the first activity data, the second activity data, or both, wherein the trained machine learning model outputs the time for sending the notification.

Aspect 4: The method of aspect 3, further comprising: inputting one or more additional features to the machine learning model for the training, wherein the one or more additional features comprises a type of workspace corresponding to the workspace identifier, a size of the workspace, a country associated with the workspace, a time of creation associated with the notification, a time zone associated with the user, or any combination thereof.

Aspect 5: The method of any of aspects 1 through 4, further comprising: retrieving the first activity data, the second activity data, or both from a concurrency data table, wherein the concurrency data table stores, for a plurality of user identifiers, a respective workspace identifier and respective amounts of time spent active in the group-based communication system for a plurality of time periods.

Aspect 6: The method of any of aspects 1 through 5, wherein the time for sending the notification is determined based at least in part on an optimization of an open rate for the notification, a click rate for the notification, or both.

Aspect 7: The method of any of aspects 1 through 6, wherein the first activity data, the second activity data, or both indicates an amount of time that a respective user is active in the group-based communication system based at least in part on a click performed by the user, scrolling performed by the user, typing performed by the user, switching channels performed by the user, an API call performed responsive to an input by the user, or any combination thereof.

Aspect 8: The method of any of aspects 1 through 7, further comprising: retrieving one or more notification settings for the user, wherein the time for sending the notification is further based at least in part on the one or more notification settings for the user.

Aspect 9: The method of any of aspects 1 through 8, wherein the notification comprises a first invitation reminder for a group-based communication channel in the group-based communication system, a second invitation reminder for a meeting scheduled in the group-based communication system, a user-defined reminder in the group-based communication system by the user, or any combination thereof.

Aspect 10: The method of any of aspects 1 through 9, further comprising: determining a second time for sending a digest email to the user based at least in part on the first activity data or a direct message to a second user based at least in part on third activity data indicating user activity in the group-based communication system for the second user.

Aspect 11: An apparatus for determining notification timing in a group-based communication system, comprising a processor; memory coupled with the processor; and instructions stored in the memory and executable by the processor to cause the apparatus to perform a method of any of aspects 1 through 10.

Aspect 12: An apparatus for determining notification timing in a group-based communication system, comprising at least one means for performing a method of any of aspects 1 through 10.

Aspect 13: A non-transitory computer-readable medium storing code for determining notification timing in a group-based communication system, the code comprising instructions executable by a processor to perform a method of any of aspects 1 through 10.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for determining notification timing in a group-based communication system, comprising:
   identifying a notification to send to a user of the group-based communication system, the user associated with a user identifier and a workspace identifier in the group-based communication system;
   retrieving one or more notification settings for the user;
   tracking first active time data for the user corresponding to the user identifier based at least in part on an application supporting the group-based communication system being displayed via a user interface of a user device operated by the user and the user interacting with the application via the user interface within a threshold time window;
   tracking second active time data for a plurality of users, additional to the user, corresponding to the workspace identifier;
   determining, based on an output of a machine learning model and the one or more notification settings for the user, a time for sending the notification based at least in part on inputting, to the machine learning model, the first active time data for the user and inputting, to the machine learning model, the second active time data for the plurality of users;
   automatically sending the notification for display via the user interface of the user device at the determined time;
   collecting user engagement data associated with the user opening the notification, clicking the notification, or both based at least in part on the determined time for sending the notification; and
   retraining the machine learning model based at least in part on the user engagement data and an optimization of an open rate for the notification, a click rate for the notification, or both to send notifications when a corresponding user is active.

2. The method of claim 1, wherein automatically sending the notification comprises:
   sending an email message comprising the notification to an email application for display via the user interface.

3. The method of claim 1, further comprising:
   training the machine learning model using the first active time data, the second active time data, or both, wherein the trained machine learning model outputs the time for sending the notification.

4. The method of claim 3, further comprising:
   inputting one or more additional features to the machine learning model for the training, wherein the one or more additional features comprises a type of a workspace corresponding to the workspace identifier, a size of the workspace, a country associated with the workspace, a time of creation associated with the notification, a time zone associated with the user, or any combination thereof.

5. The method of claim 1, further comprising:
   retrieving the first active time data, the second active time data, or both from a concurrency data table, wherein the concurrency data table stores, for a plurality of user identifiers, a respective workspace identifier and respective amounts of time spent active in the application supporting the group-based communication system for a plurality of time periods.

6. The method of claim 1, wherein the first active time data, the second active time data, or both indicates an amount of time that a respective user is active in the application supporting the group-based communication system based at least in part on a click performed by the user via the user interface, scrolling performed by the user via the user interface, typing performed by the user, switching channels performed by the user in the application, an application programming interface (API) call performed responsive to an input by the user, or any combination thereof.

7. An apparatus for determining notification timing in a group-based communication system, comprising:
one or more processors;
one or more memories coupled with the one or more processors; and
instructions stored in the one or more memories and executable by the one or more processors, individually or in any combination, to cause the apparatus to:
identify a notification to send to a user of the group-based communication system, the user associated with a user identifier and a workspace identifier in the group-based communication system;
retrieve one or more notification settings for the user;
track first active time data for the user corresponding to the user identifier based at least in part on an application supporting the group-based communication system being displayed via a user interface of a user device operated by the user and the user interacting with the application via the user interface within a threshold time window;
track second active time data for a plurality of users, additional to the user, corresponding to the workspace identifier;
determine, based on an output of a machine learning model and the one or more notification settings for the user, a time for sending the notification based at least in part on inputting, to the machine learning model, the first active time data for the user and inputting, to the machine learning model, the second active time data for the plurality of users;
automatically send the notification for display via the user interface of the user device at the determined time;
collect user engagement data associated with the user opening the notification, clicking the notification, or both based at least in part on the determined time for sending the notification; and
retrain the machine learning model based at least in part on the user engagement data and an optimization of an open rate for the notification, a click rate for the notification, or both to send notifications when a corresponding user is active.

8. The apparatus of claim 7, wherein the instructions to send the notification are executable by the one or more processors, individually or in any combination, to cause the apparatus to:
send an email message comprising the notification to an email application for display via the user interface.

9. The apparatus of claim 7, wherein the instructions are further executable by the one or more processors, individually or in any combination, to cause the apparatus to:
train the machine learning model using the first active time data, the second active time data, or both, wherein the trained machine learning model outputs the time for sending the notification.

10. The apparatus of claim 9, wherein the instructions are further executable by the one or more processors, individually or in any combination, to cause the apparatus to:
input one or more additional features to the machine learning model for the training, wherein the one or more additional features comprises a type of a workspace corresponding to the workspace identifier, a size of the workspace, a country associated with the workspace, a time of creation associated with the notification, a time zone associated with the user, or any combination thereof.

11. The apparatus of claim 7, wherein the instructions are further executable by the one or more processors, individually or in any combination, to cause the apparatus to:
retrieve the first active time data, the second active time data, or both from a concurrency data table, wherein the concurrency data table stores, for a plurality of user identifiers, a respective workspace identifier and respective amounts of time spent active in the application supporting the group-based communication system for a plurality of time periods.

12. A non-transitory computer-readable medium storing code for determining notification timing in a group-based communication system, the code comprising instructions executable by a processor to:
identify a notification to send to a user of the group-based communication system, the user associated with a user identifier and a workspace identifier in the group-based communication system;
retrieve one or more notification settings for the user;
track first active time data for the user corresponding to the user identifier based at least in part on an application supporting the group-based communication system being displayed via a user interface of a user device operated by the user and the user interacting with the application via the user interface within a threshold time window;
track second active time data for a plurality of users, additional to the user, corresponding to the workspace identifier;
determine, based on an output of a machine learning model and the one or more notification settings for the user, a time for sending the notification based at least in part on inputting, to the machine learning model, the first active time data for the user and inputting, to the machine learning model, the second active time data for the plurality of users;
automatically send the notification for display via the user interface of the user device at the determined time;
collect user engagement data associated with the user opening the notification, clicking the notification, or both based at least in part on the determined time for sending the notification; and
retrain the machine learning model based at least in part on the user engagement data and an optimization of an open rate for the notification, a click rate for the notification, or both to send notifications when a corresponding user is active.

13. The non-transitory computer-readable medium of claim 12, wherein the instructions to send the notification are executable by the processor to:
send an email message comprising the notification to an email application for display via the user interface.

14. The non-transitory computer-readable medium of claim 12, wherein the instructions are further executable by the processor to:
train the machine learning model using the first active time data, the second active time data, or both, wherein the trained machine learning model outputs the time for sending the notification.

15. The non-transitory computer-readable medium of claim 14, wherein the instructions are further executable by the processor to:
input one or more additional features to the machine learning model for the training, wherein the one or more additional features comprises a type of a workspace corresponding to the workspace identifier, a size of the workspace, a country associated with the workspace, a time of creation associated with the notification, a time zone associated with the user, or any combination thereof.

16. The non-transitory computer-readable medium of claim 12, wherein the instructions are further executable by the processor to:
retrieve the first active time data, the second active time data, or both from a concurrency data table, wherein the concurrency data table stores, for a plurality of user identifiers, a respective workspace identifier and respective amounts of time spent active in the application supporting the group-based communication system for a plurality of time periods.

\* \* \* \* \*